United States Patent [19]

Thayer et al.

[11] Patent Number: 5,341,494

[45] Date of Patent: Aug. 23, 1994

[54] MEMORY ACCESSING SYSTEM WITH AN INTERFACE AND MEMORY SELECTION UNIT UTILIZING WRITE PROTECT AND STROBE SIGNALS

[75] Inventors: John S. Thayer; Dale J. Mayer; Javier F. Izquierdo, all of Houston; Paul R. Culley, Cypress; John A. Landry, Tomball, all of Tex.

[73] Assignee: Compaq Computer Corporation, Houston, Tex.

[21] Appl. No.: 165,514

[22] Filed: Dec. 10, 1993

Related U.S. Application Data

[63] Continuation of Ser. No. 17,976, Feb. 12, 1993, abandoned, which is a continuation of Ser. No. 431,666, Nov. 3, 1993, abandoned.

[51] Int. Cl.⁵ .............................................. G06F 12/06
[52] U.S. Cl. ............................ 395/425; 364/DIG. 1; 364/246.3; 364/243; 364/246.6
[58] Field of Search .................. 364/200, 900; 345/425

[56] References Cited

U.S. PATENT DOCUMENTS

| | | | |
|---|---|---|---|
| 4,028,663 | 6/1977 | Royer et al. | 395/425 |
| 4,151,611 | 8/1979 | Sugawara et al. | 365/227 |
| 4,285,039 | 8/1981 | Patterson et al. | 395/325 |
| 4,456,966 | 6/1984 | Bringol et al. | 395/425 |
| 4,481,570 | 11/1984 | Wiker | 395/375 |
| 4,571,676 | 2/1986 | Mantellina et al. | 395/425 |
| 4,639,721 | 1/1987 | Eto et al. | 340/747 |
| 4,665,506 | 5/1987 | Cline et al. | 364/200 |
| 4,695,948 | 9/1987 | Blevins et al. | 364/200 |
| 4,698,750 | 10/1987 | Wilkie et al. | 364/200 |
| 4,734,851 | 3/1988 | Director | 395/425 |
| 4,849,875 | 7/1989 | Fairman et al. | 395/400 |
| 4,903,197 | 2/1990 | Wallace et al. | 395/425 |
| 4,941,107 | 7/1990 | Hasebe | . |
| 4,980,850 | 12/1990 | Morgan | 395/425 |
| 5,033,001 | 7/1991 | Ibi | 395/550 |

FOREIGN PATENT DOCUMENTS

| | | |
|---|---|---|
| 0200440 | 11/1986 | European Pat. Off. . |
| 0338089A1 | 10/1989 | European Pat. Off. . |
| 2949768A1 | 6/1980 | Fed. Rep. of Germany . |
| WO-4-8 809012 | 11/1988 | PCT Int'l Appl. . |

OTHER PUBLICATIONS

Mano, Computer System Architecture, 1982, pp. 217–247, pp. 403–426, and pp. 515–517.

*Primary Examiner*—Joseph L. Dixon
*Assistant Examiner*—Matthew M. Kim
*Attorney, Agent, or Firm*—Pravel, Hewitt, Kimball & Krieger

[57] ABSTRACT

A memory mapping and module enabling circuit for allowing logical 128 kbyte memory blocks to be defined for any location in any module connected to a memory system. A RAM is addressed by the system address lines defining 128 kbyte blocks, with the output data providing the row address strobe enable signals for a particular memory module and the address values necessary to place the 128 kbyte block within the module. Various other parameters such as write protect status and memory location are also provided by the RAM. Circuits and techniques for programming and reading the RAM are provided.

11 Claims, 17 Drawing Sheets

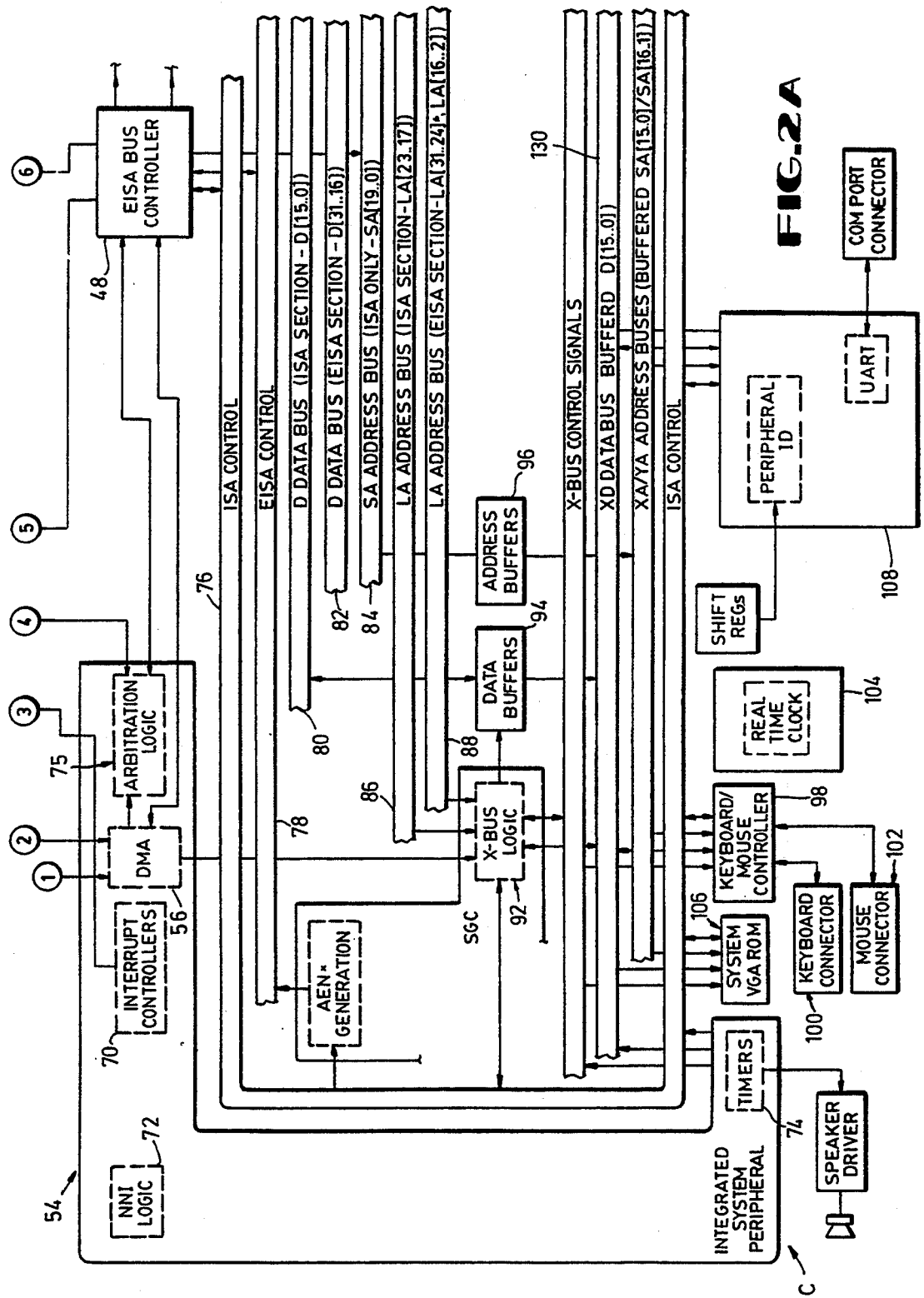

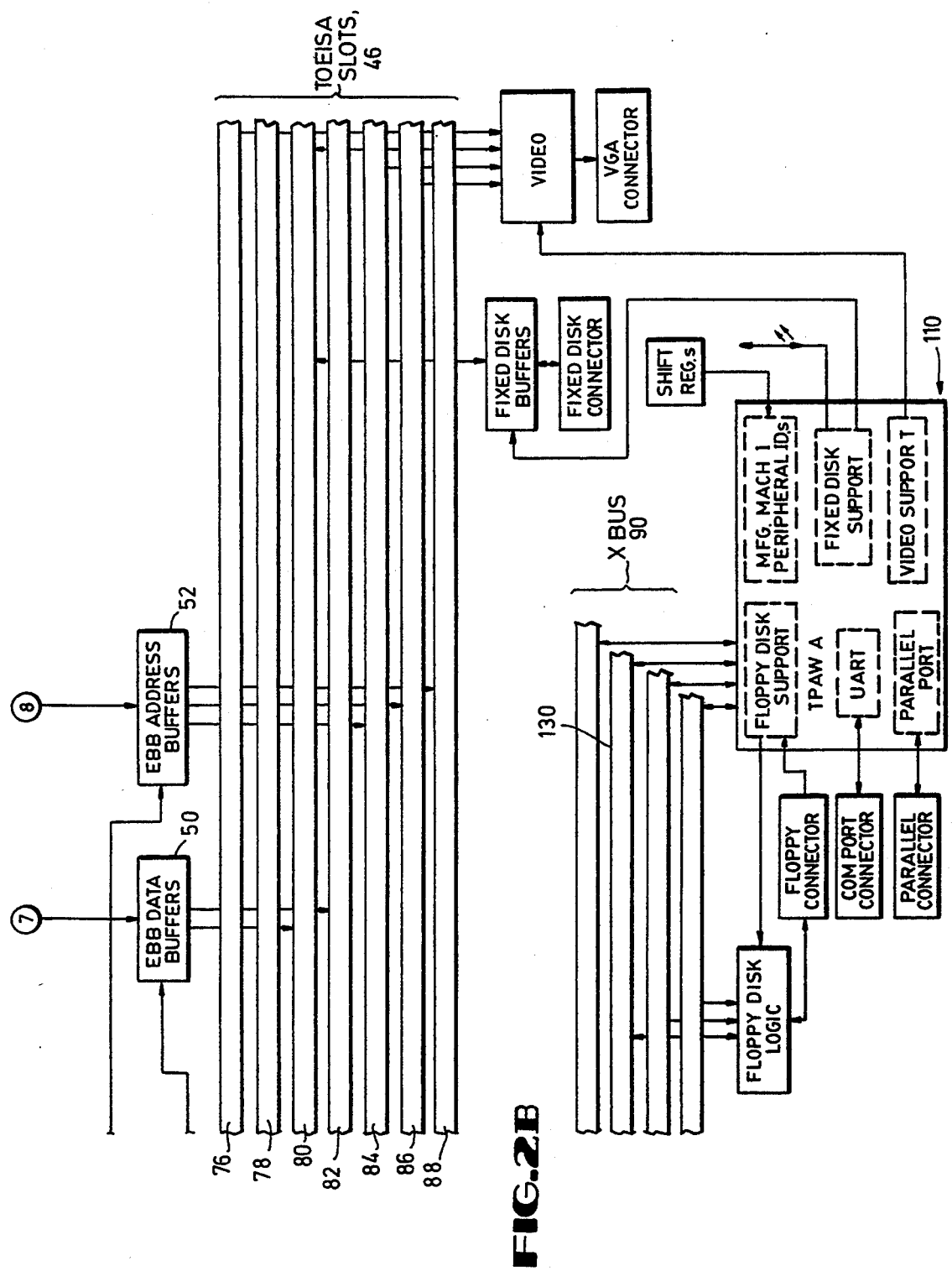
FIG.2.B

FIG.11A
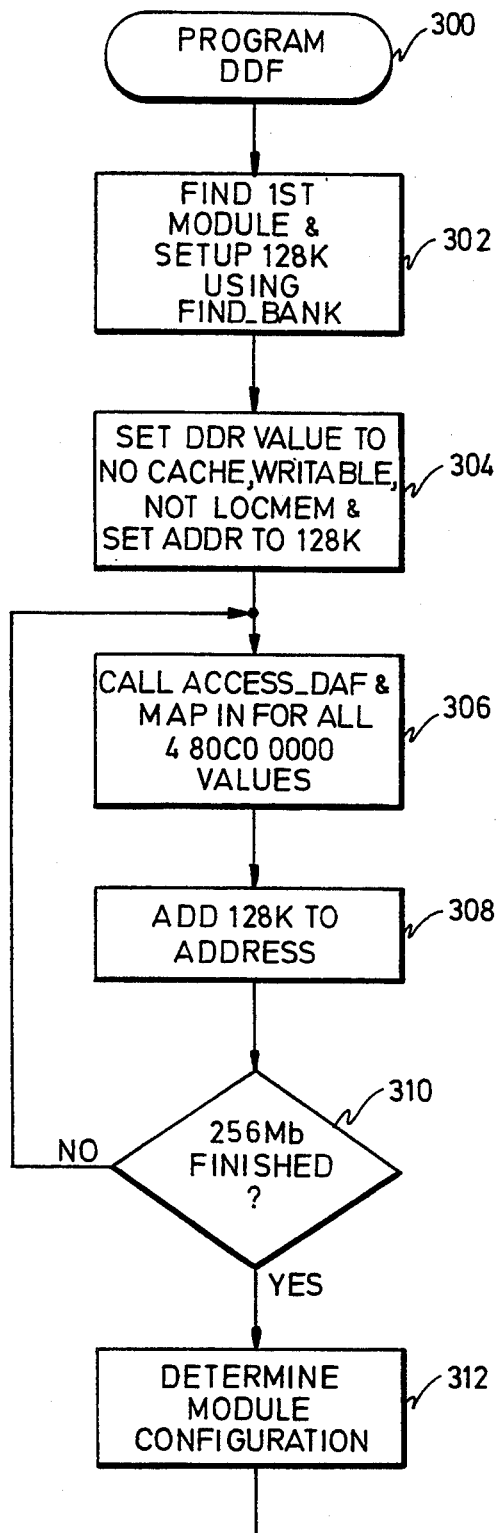
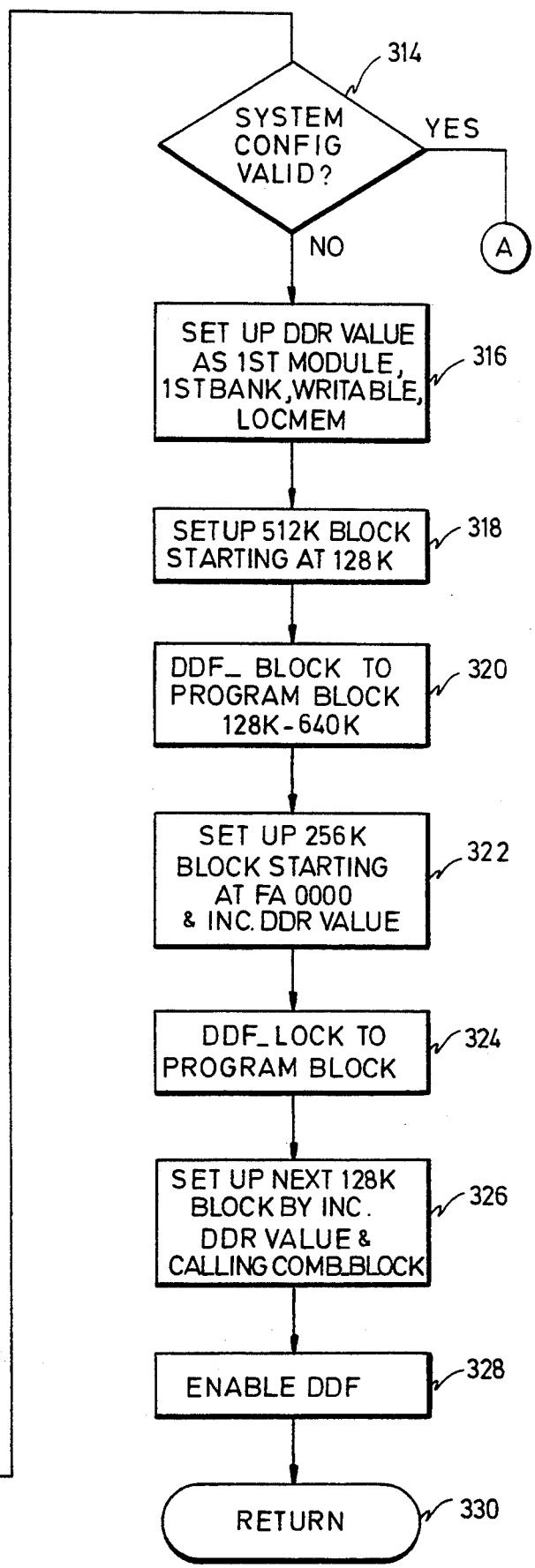

FIG.12
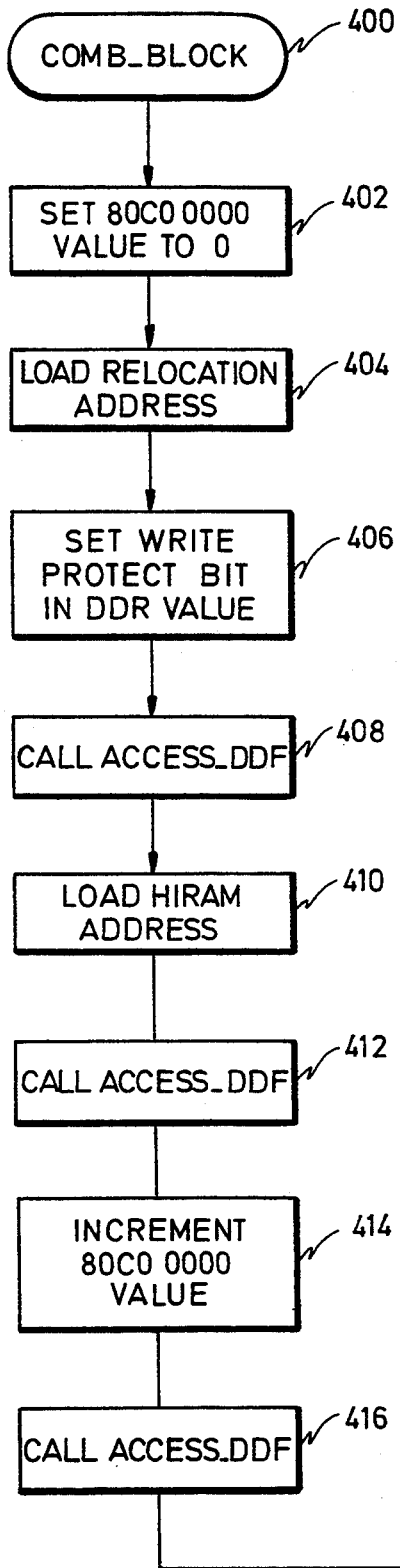
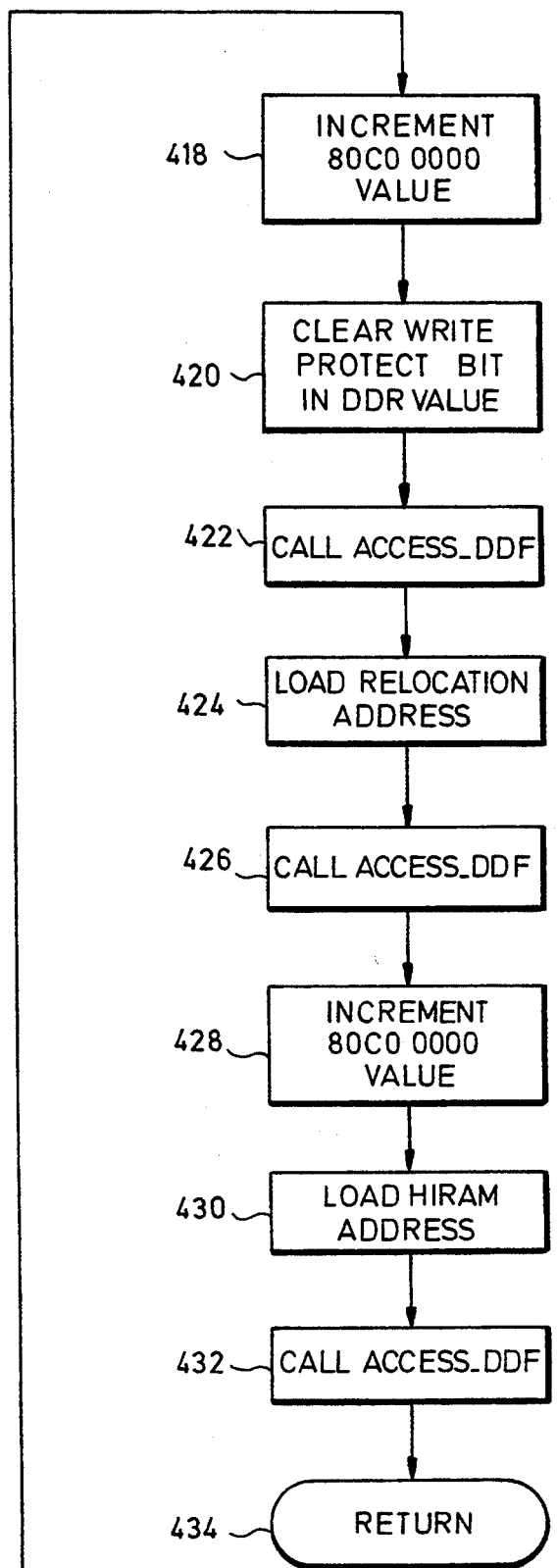

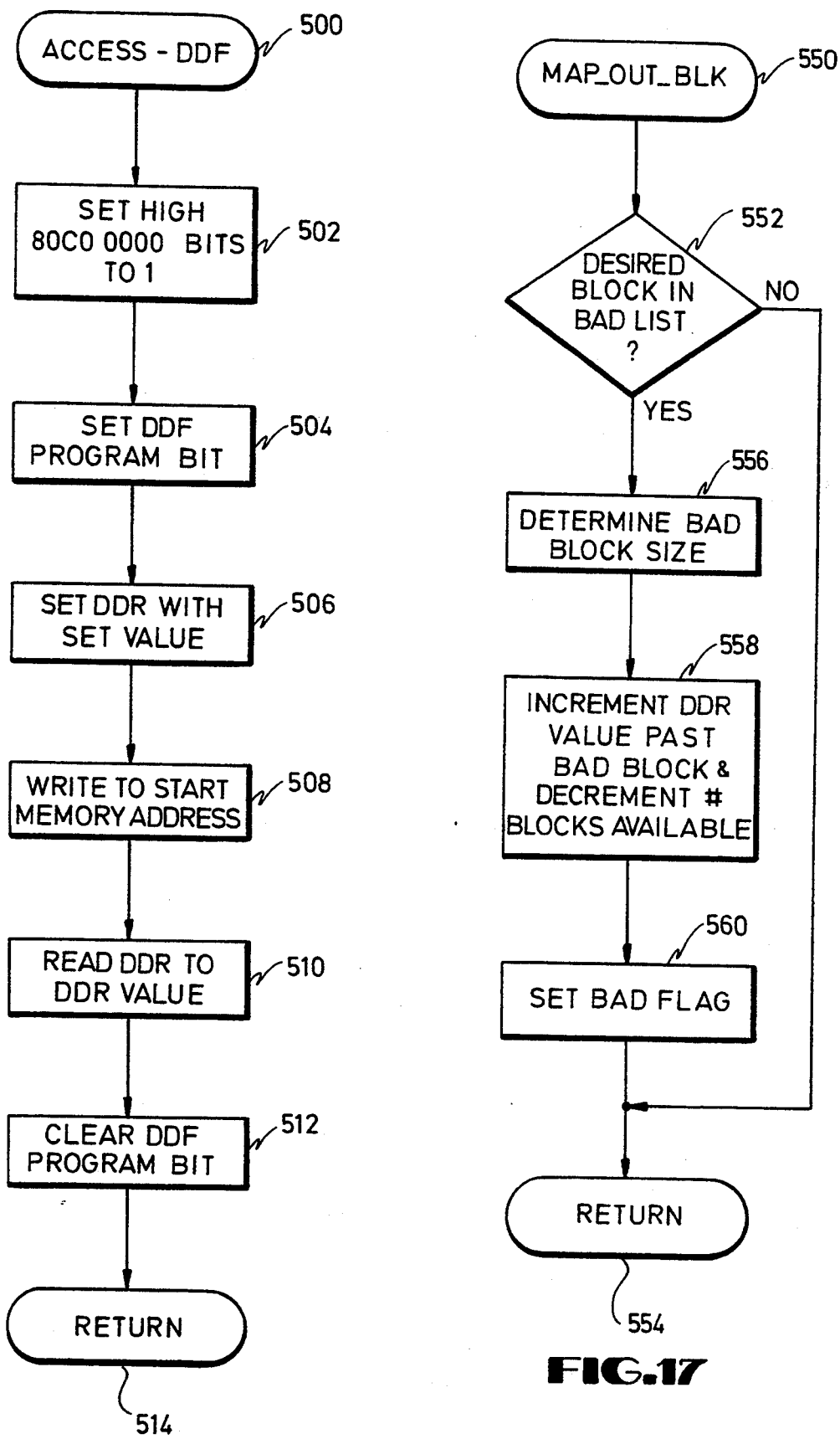

MEMORY ACCESSING SYSTEM WITH AN INTERFACE AND MEMORY SELECTION UNIT UTILIZING WRITE PROTECT AND STROBE SIGNALS

This is a continuation of co-pending application Ser. No. 08/017,976, filed on Feb. 12, 1993, which is a continuation of co-pending application Ser. No. 07/431,666, filed on Nov. 3, 1993, both abandoned.

BACKGROUND OF THE INVENTION

1. Field of the Invention

The invention relates to memory mapping and enabling systems used in computers.

2. Description of the Related Art

Personal computer systems are becoming more complex and powerful at a rapid rate. With the introductions by Intel Corporation (Intel) of the 80286 and 80386 microprocessors, large amounts of memory could be readily utilized. Therefore, it was desirable that the computer system be capable of containing large amounts of memory, particularly memory that was the same width as the microprocessor in the computer system. The situation was complicated because memory was relatively expensive, so the memory was only added in certain modular sizes, often through the use of piggy-backed modules or single in-line memory modules which contained dynamic random access memory (DRAM) devices. The modules varied in cost and memory size based on the number and size of the memory devices utilized. The system board or base memory board contained numerous locations for the insertion of the modules. Conventionally the modules had very little circuitry beyond the memory devices, so the various strobe signals needed by DRAM's had to be developed by the memory system. This required developing the proper row and column address strobe signals for the appropriate module. Problems arose because of the different size modules and because the modules could physically be installed in one of several locations. Because of limitations of the strobe developing circuitry, the modules were required to be installed in certain orders, depending on module size and the number of modules. Thus, system installers and users were limited in their flexibility of installing memory modules.

Additionally, provisions had to be made for portions of the memory failing. The cost of memory modules was such that it was not reasonable to require replacement of an entire module if only a portion of the module failed. Various remapping schemes were developed to perform this function automatically, but the techniques exacerbated the strobe development problems. Therefore the remapping capabilities were relatively limited. Thus the user had limitations on where memory modules could be located in the system and how many errors could develop before requiring replacement of the module.

Further complicating the situation was the need, especially in the 80386-based computer systems, to transfer the BIOS code from slow read only memory (ROM) to faster random access memory (RAM) to improve system performance. Also, certain areas of memory had to be write protected for various reasons. Add these situations to the other factors and the final result had been computer systems with complex memory system designs which were still relatively inflexible as to the location and arrangement of memory modules and remapping capabilities.

SUMMARY OF THE INVENTION

A computer system Incorporating the present invention has improved remapping and module location flexibility without the generation of great circuit complexity. The memory is organized into 128 kbyte blocks. For each 128 kbyte block a row address strobe enable code, the necessary address lines to place the 128 kbyte block within a module's address space, the write protect status and the local or external location of the memory are specified. This information is contained in a data destination facility (DDF) RAM to allow the characteristics for each 128 kbyte block to be easily changed for each individual computer system. This allows modules to be sized and located as desired, allows remapping around bad areas and allows BIOS ROM remapping and write protection using the same mechanism.

The data is written into or read from the DDF RAM by setting a programming bit and performing a memory write operation. If a write operation is to occur, the desired value is placed in an I/O register before the memory write operation occur. If a read operation is desired, the I/O register is read after the memory write operation has occurred. The state of a particular address bit indicates whether the operation is a read of or a write to the DDF RAM. When the programming bit is set, the memory write operation is disabled to the actual memory devices so that no erroneous data is written to the memory devices.

Software located in the BIOS ROM determines where the modules are located, their size, the desired memory characteristics, the local or external memory location and other desired parameters and then programs the DDF RAM appropriately.

BRIEF DESCRIPTION OF THE FIGURES

A better understanding of the present invention can be obtained when the following detailed description of the preferred embodiment is considered in conjunction with the following drawings, in which:

FIGS. 1 and 2 are schematic block diagrams of a computer system incorporating the present invention;

FIG. 8 is a state machine diagram of portions of the circuitry of FIG. 3;

FIGS. 11A, 11B, 11C and 12–18 are flowchart illustrations of the operation of software incorporating the present invention.

DETAILED DESCRIPTION OF THE PREFERRED EMBODIMENT

Figure 1:
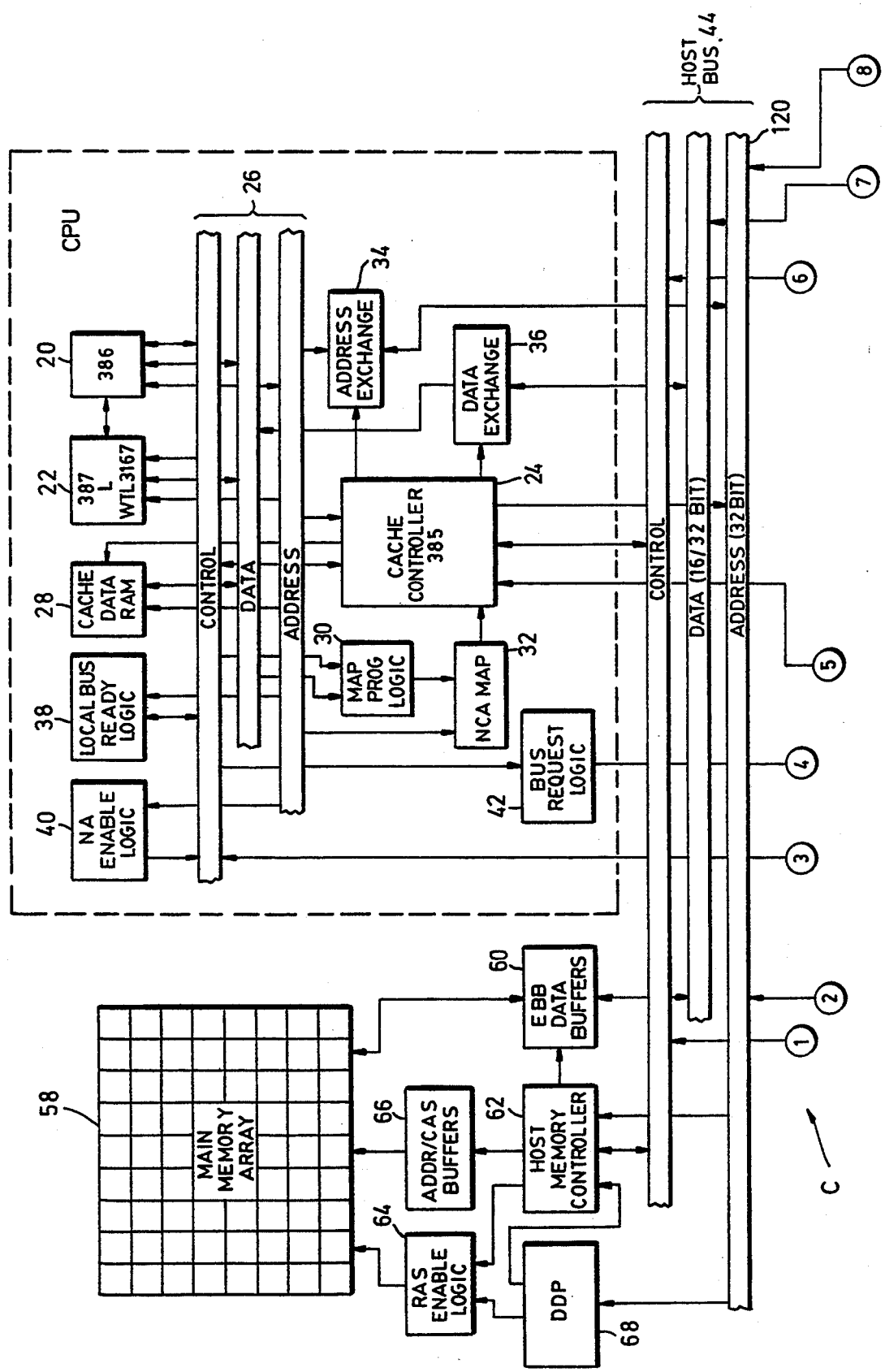

Referring now to FIGS. 1 and 2, the letter C designates generally a computer system incorporating the present invention. For clarity, system C is shown in two portions, with the interconnections between FIGS. 1 and 2 designated by reference to the circled numbers one to eight. System C is comprised of a number of block elements interconnected via four buses. Throughout this specification, signal mnemonics with an asterisk following the signal descriptors indicates the signal is active at a logic low level. Signal mnemonics having numbers or ranges between angled brackets refer to those particular bits or positions in a bus.

In FIG. 1, a computer system is depicted. A central processing unit CPU comprises a processor 20, a numerical coprocessor 22 and a cache memory controller 24 and associated logic circuits connected to a local processor bus 26. Associated with cache controller 24 is high speed cache data random access memory 28, noncacheable memory address map programming logic circuitry 30, noncacheable address memory 32, address exchange latch circuitry 34 and data exchange transceiver 36. Associated with the CPU also are local bus ready logic circuit 38, next address enable logic circuit 40 and bus request logic circuit 42.

The processor 20 is preferably an Intel 80386 microprocessor. The processor 20 has its control, address and data lines interfaced to the local processor bus 26. The coprocessor 22 is preferably an Intel 80387 and/or Weitek WTL 3167 numeric coprocessor interfacing with the local processor bus 26 and the processor 20 in the conventional manner. The cache ram 28 is preferably suitable high-speed static random access memory which interfaces with the address and data elements of bus 26 under control of the cache controller 24 to carry out required cache memory operations. The cache controller is preferably an Intel 82385 cache controller configured to operate in two-way set associative master mode. In the preferred embodiment the components are the 33 MHz versions of the respective units. Address latch circuitry 34 and data transceiver 36 interface the cache controller 24 with the processor 20 and provide a local bus interface between the local processor bus 26 and a host bus 44.

Circuit 38 is a logic circuit which provides a bus ready signal to control access to the local bus 26 and indicate when the next cycle can begin. The enable circuit 40 is utilized to indicate that the next address of data or code to be utilized by subsystem elements in pipelined address mode can be placed on the local bus 26.

Noncacheable memory address map programmer 30 cooperates with the processor 20 and the noncacheable address memory 32 to map noncacheable memory locations. The noncacheable address memory 32 is utilized to designate areas of system memory that are noncacheable to avoid many types of cache memory incoherency. If the processor 20 is an Intel 80486, preferably with an external cache system, the noncacheable address programmer 30 and memory 32 are not provided, but noncacheable information is provided as will be described.

The bus request logic circuit 42 is utilized by the processor 20 and associated elements to request access to the host bus 44 in situations such as when requested data is not located in the cache memory 28 and access to system memory is required.

In the drawings, system C is configured having the processor bus 26, the host bus 44, an extended industry standard architecture (EISA) bus 46 (FIG. 2) and an X bus 90. The details of the portion of the system illustrated in FIG. 2, and not discussed in detail below are not significant to the present invention other than to illustrate an example of a fully configured computer system The EISA specification Version 31 is included in U.S. Pat. No. 5,101,492, issued Mar. 31, 1992, and fully explains requirements of an EISA system. The portion of system C illustrated in FIG. 2 is essentially a configured EISA system which includes the necessary EISA bus 46, an EISA bus controller 48, data latches and transceivers 50 and address latches and buffers 52 to interface between the EISA bus 46 and the host bus 44. Also illustrated in FIG. 2 is an integrated system peripheral 54, which incorporates a number of the elements used in an EISA-based computer system.

The integrated system peripheral (ISP) 54 includes a direct memory access controller 56 for controlling access to main memory 58 (FIG. 1) or memory contained in EISA slots and input/output (I/O) locations without the need for access to the processor 20. The main memory array 58 is considered to be local memory and comprises a memory circuit array of size suitable to accommodate the particular requirements of the system. The ISP 54 also includes interrupt controllers 70, nonmaskable interrupt logic 72 and system timers 74 which allow control of interrupt signals and generate necessary timing signals and wait states in a manner according to the EISA specification and conventional practice. In the preferred embodiment, processor generated interrupt requests are controlled via dual interrupt control circuits emulating and extending conventional Intel 8259 interrupt controllers. The ISP 54 also includes bus arbitration logic 75 which, in cooperation with the bus controller 48, controls and arbitrates among the various requests for the EISA bus 46 by the cache controller 24, the DMA controller 56 and bus master devices located on the EISA bus 46.

The main memory array 58 is preferably dynamic random access memory. Memory 58 interfaces with the host bus 44 via a data buffer circuit 60, a memory controller circuit 62 and a data destination facility (DDF) 68. The buffer 60 performs data transceiving and parity generating and checking functions. The memory controller 62 and the DDF 68 interface with the memory 58 via address multiplexer and column address strobe buffers 66 and row address enable logic circuit 64. The DDF 68 and its operation are provided in greater detail in later portions of this specification.

The EISA bus 46 includes ISA and EISA control buses 76 and 78, ISA and EISA data buses 80 and 82 and address buses 84, 86 and 88. System peripherals are interfaced via the X bus 90 in combination with the ISA control bus 76 from the EISA bus 46. Control and data/address transfer for the X bus 90 are facilitated by X bus control logic 92, data transceivers 94 and address latches 96.

Attached to the X bus 90 are various peripheral devices such as keyboard/mouse controller 98 which interfaces the X bus 90 with a suitable keyboard and mouse via connectors 100 and 102, respectively. Also attached to the X bus 90 are read only memory circuits 106 which contain basic operations software for the system C and for system video operations. A serial communications port 108 is also connected to the system C via the X bus 90. Floppy and fixed disk support, a parallel port, a second serial port, and video support circuits are provided in block circuit 110.

The DDF circuitry 68 contains four primary functional blocks, the DDF register 122 (FIG. 3), the DDF state machine logic 124, the DDF RAM 126 and a DDF programmable array logic circuit (PAL) 128. These four blocks are connected to the appropriate buses, to the host memory controller 62 and the RAS enable logic 64.

The DDF register 122 is connected to the address buses 86 and 88, the ISA control bus 76 and bits 7-0 of the X data bus 130 so that the processor 20 can communicate with the DDF register 122 to read and write data to the contained memory and I/O port locations. Other inputs to the DDF register 122 are the DDFCLK signal produced by the DDF state machine 124 and the DDFOE* signal, also produced by the DDF state machine 124. The DDFCLK signal is used to load data into the DDF register 122 and the DDFOE* signal is used to enable the outputs of the DDF register 122. The DDF register 122 has a number of outputs including the DDFD<15-0> signals, which form a 16 bit data bus which effectively comprises the output or input of the DDF register 122 and connects the DDF register 122 to the data terminals of the DDF RAM 126. Also output by the DDF register 122 are two signals referred to as RELO* and WP*. These signals are compatible signals provided to keep the present computer system C compatible with previous computer systems and are used to indicate the desired relocation of the BIOS ROM and the write protect status of particular memory segments. Two final outputs are produced by the DDF register 122 and these are the DDFEN signal, which indicates that the DDF function is enabled, and the DDFPGM signal, which indicates that the DDF system is in programming mode.

The DDFPGM signal is one input to the DDF state machine logic 124. The other inputs to the state machine are signals from the host bus 46 and are the HA<2> address line, the HM-IO signal, the HADS* signal, the HW-R signal, the HD-C signal, and the CLK1 signal. The HM-IO signal is the M-IO signal present on the host bus 46 and indicates whether a memory or I/O space operation is occurring. The HADS* signal is the address strobe signal present on the host bus 46, while the HW-R signal is the write or read signal present on the host bus 46 to indicate whether a write or read operation will be occurring. The HD-C signal is the signal appearing on the host bus 46 which indicates whether a data or code segment is being obtained. The falling edge of the CLK1 signal is used to progress and clock the DDF state machine 124 with the other signals providing conditions for the branching of the DDF state machine 124. The DDF state machine 124 includes circuitry which develops the DDFWE*, DDFOE* and DDFCLK signals. The DDFWE* signal is used to indicate to the DDF RAM 126 that a write operation is occurring and controls storage of data in the DDF RAM 126. The DDFOE* signal is used to enable the DDF register 122 and, when encoded with other signals, to enable the output of data by the DDF RAM 126. The progression of the DDF state machine logic 124 is explained more fully later on.

The DDF PAL 128 receives a number of different input signals and produces several output signals. The various input signals to the DDF PAL 128 are the DDFEN signal, the DDFOE* signal, the DDFWE* signal, the HW-R signal, HM-IO signal and the HA<31-28 and 19> signals from the host address bus 120. The DDF PAL 128 is used to produce the actual output enable signal provided to the DDF RAM 126 and produces the various write protect, local memory and other miscellaneous signals utilized and output by the DDF portion 68 for memory addresses outside the bounds of that for which the DDF 68 is programmable.

In the preferred embodiment, while the preferred 80386 microprocessor 20 can address 4 Gbytes of memory, the preferred embodiment is implemented so that only 256 Mbytes of memory are controllable using the DDF 68. The outputs of the DDF PAL 128 are the RAMOE* signal which is provided to the DDF RAM 126 to activate the data output of the DDF RAM 126, the HWP signal, the HLOCMEM* signal, the HCW signal and the HNCA* signal. These last four signals are tri-state signals provided for interfacing with the appropriate signals produced by the DDF RAM 126 for the memory area beyond the addressing space of the DDF RAM 126. The HWP signal is the write protect signal, while the HLOCMEM* signal is the local memory signal, which indicates when low that the memory being addressed is located in the main memory array 58. The HNCA signal may be used in a system using an 80486 to provide the noncacheable address information. The HCW signal is not utilized in the preferred embodiment but can be used to indicate a cache write through location or other desired uses.

The DDF RAM 126 has 13 address input terminals, 16 data input/output terminals, a write enable input terminal and an output enable input terminal. The address lines A<10-0> of the DDF RAM 126 are connected respectively to the HA<27-17> signals, thus allowing the appropriate number of 128 kbyte blocks which comprise a 256 Mbyte segment to be addressed. The RELO* signal is connected to the A<11> input while the WP* signal is connected to the A<12> input In this manner the compatibility with previous systems can be maintained while providing the full DDF functions The DDFD<15-0> signals are connected to the respective data terminals of the DDF RAM 126 to both provide data during DDF write operations and to receive data during DDF read operations. The data terminals of the DDF RAM 126 are also connected to various inputs of the host memory controller 62 and the RAS enable logic 64 with the appropriate designations being indicated. For example, data terminals <6-0> are connected to the TA<23-17> signals of the host memory controller 62 and thus provide the upper 7 bits of the address which is provided to the host memory controller 62, thus allowing remapping of the 128 kbyte blocks inside the appropriate modules.

It is noted that the TA<22,20> signals are latched in a transparent latch 127. The outputs of the DDF RAM 126 are provided to the inputs of the latch 127 and the outputs of the latch 127 are connected to the host memory controller 62. The latch 127 is used to prevent erroneous operation of the host memory controller 62 should the cache controller 24 provide a false latching signal, the BACP signal for an 82385, to the address exchange circuitry 34. The latch 127 gate input is connected to a signal referred to as MRASA* produced by the host memory controller 62. The MRASA* is the master row address strobe signal provided to the RAS enable logic 64 and is kept low during cache hit cycles while the processor 20 has control of the host bus 44 and goes high during portions of page miss operations to enable new values to be latched. The DDFD<6-0> signals are connected to these TA<23-17> lines, which are also pulled up to a high level by resistors 130.

The data terminals <12-8> of the DDF RAM 126 are connected to the RASEN*<4-0> signals, which are an encoded version of which particular bank on the available modules is to be activated The DDFD<12-8> signals are connected respectively to the RASEN-

*<4-0> signals. The RASEN*<4-0> signals are pulled up by resistors 132. Two of the remaining four data terminals of the DDF RAM 126 are connected to the HCW and HNCA* signals, which are also appropriately connected to bits in the DDFD signal bus. One of the remaining data terminals of the DDF RAM 126 is connected to the HWP signal, which is connected to an input of the transparent latch 127. The output of the latch 127 is connected to the write protect input of the host memory controller 62. The transparent latch 127 is used for similar reasons as with the TA<22,20> signals.

The remaining data terminal of the DDF RAM 126 is connected to the HLOCMEM* signal, which is contained in the host bus 44 for use by the EISA bus controller 48 and is connected to the HLOCKMEM* input of the host memory controller 62. This allows the HCANCEL signal to force a cancelled signal to appear as an external memory operation to the host memory controller 62 and an internal memory operation to the EISA bus controller 48, so that no system memory cycle is performed. These various signals are pulled to a high level by resistors 134, 136, 138 and 140. The HCW and HNCA* signals are not connected and can thus be utilized for additional signals or needs as desired.

The host memory controller 62 also receives inputs of the HA<16-2> and HBE*<3-0> signals to complete the addressing and receives the appropriate control signals from the host bus 46. The host memory controller 62 then takes the signals that are appropriate and converts them to those necessary for communication with the memory array 58 to obtain the data as desired. Thus the full address being applied to the memory array 58 is provided by the TA<23-17> and HA<16-2> signals, the memory array 58 being configured to be 32 bits wide, so that the HBE*<3-0> signals only control the various bytes which are to be selected. Thus by properly programming the values which will appear on the TA<23-17> lines, the appropriate 128 kbyte block in a particular bank in a particular module can be addressed, with the RASEN*<4-0> signal selecting the desired bank in the memory subsystem.

In the preferred embodiment, several types of modules can be used in forming the main memory array 58. The modules are defined in all cases as having two different banks per module, with the modules being either single wide or double wide. Each bank in a single wide module has 1 Mbyte of RAM, there thus being 2 Mbytes in the module, or 4 Mbytes of memory devices, thus forming an 8 Mbyte module. Each bank in the double wide module contains 4 Mbytes or 16 Mbytes of memory devices, so that 8 Mbyte or 32 Mbyte modules are available. The single wide modules are addressed such that one particular RASEN combination is appropriate for each bank, while when double-wide modules are utilized every other RASEN value is utilized to select the appropriate bank.

Figure 10:
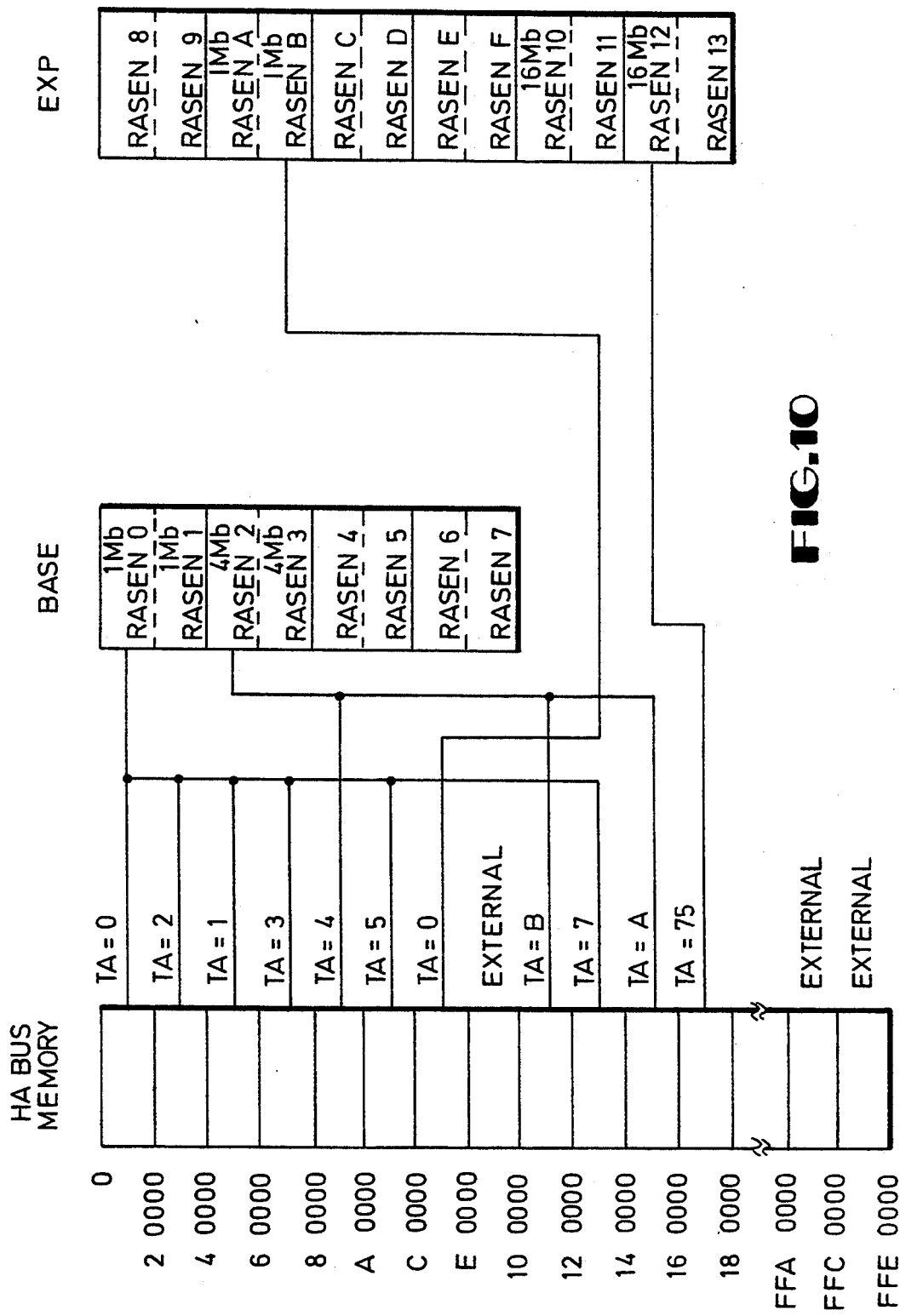
FIG. 10 is a representation Of the logical to physical relationship of the present invention.

FIG. 10 shows a representative mapping of the address which is to appear on the address lines <31-2> of the host address bus 46 with the appropriate desired map of the TA values and the RASEN values. In this description address and RASEN values are referenced in hexadecimal notation, while bit locations in a bus and memory sizes are referred to in decimal notation. For example, the first 128 kbyte block from address 0 to 20000 is remapped to have a TA value equal to 0 and a RASEN value equal to 0, so that it is mapped into the first 128 kbyte block of the RASEN 0 bank of the first 2 Mbyte module. The next 128 kbyte block of memory from 20000 to 40000 is mapped to the TA value equal to 2 and a RASEN value equal to 0 so that the third 128 kbyte block of the first 1 Mbyte bank is addressed. The third 128 kbyte memory space from address 40000 to 60000 is mapped so that a TA value of 1 is present and an RASEN value of 0 is present so that the second 128 kbyte block of the first bank is accessed for this memory range. Thus it can be seen that the blocks in the bank in the memory need not be taken in order but can be taken out of order as desired. The fourth 128 kbyte block of memory from address 60000 to 80000 receives a TA value of 3 and a RASEN value of 0.

In the Figure, the next 128 kbyte block of memory from address 80000 to A0000 receives a TA value of 4 but an RASEN value of 2 so that the fifth 128 kbyte block in the first bank of the 8 Mbyte module is accessed for this particular memory value block. For the memory block from address A0000 to C0000 a TA value of 5 is applied as well as an RASEN value of 0, so that the sixth 128 kbyte block of the first bank of memory is utilized. It has been noted that the fifth 128 kbyte block of the first bank has been skipped, for example because it is bad, thus not requiring the entire 2 Mbyte module to be replaced if a particular 128 kbyte block is unusable. The memory address block from address C0000 to E0000 receives a TA value equal to 0 and an RASEN value equal to B so that the first 128 kbyte block of the second bank of the module which appears in the second module location on an expansion board in the preferred embodiment is accessed. The 128 kbyte memory block from address E0000 to 100000 is classified to be external by having the HLOCMEM* signal high, so that no values need to be programmed to the TA or RASEN bits because they will not be utilized in this operation. This address range is then handled by external memory, such as that present on boards located in the EISA slots. As can be seen this process continues as shown in FIG. 10 so that various forms of remapping are possible as desired, so that particular blocks can easily be programmed around and the modules need not be located in a sequential order having memory sizes in particular order. The system C with the present invention can utilize all the memory which is readily available without requiring the user to consult special tables or otherwise have restrictions on its physical location and the size ordering.

The state machine in the DDF state machine logic 124 is shown in diagramatic form in FIG. 8 with four states, with the states being advanced or possibly changed based on the falling edge of the CLK1 signal. At reset the state machine starts at state DZ. It remains in state DZ if the DDFPGM signal is low, the HADS* signal is high, the HM-IO signal is low, the HW-R signal is low or the HD-C signal is low. Thus, it stays in this idle state if DDF programming mode is not enabled and a memory data write operation is not occurring. When the DDF program mode is enabled, a memory write data operation is occurring and the address select strobe is low, then on the falling CLK1 signal edge control proceeds to state DA. Control loops at state DA while the HADS* signal is low and proceeds to state DB on the CLK1 signal falling edge after the HADS* signal has returned high. The state machine proceeds through states DB and DC on the proceeding CLK1 signal falling edges and returns to state DZ.

Figure 8A:
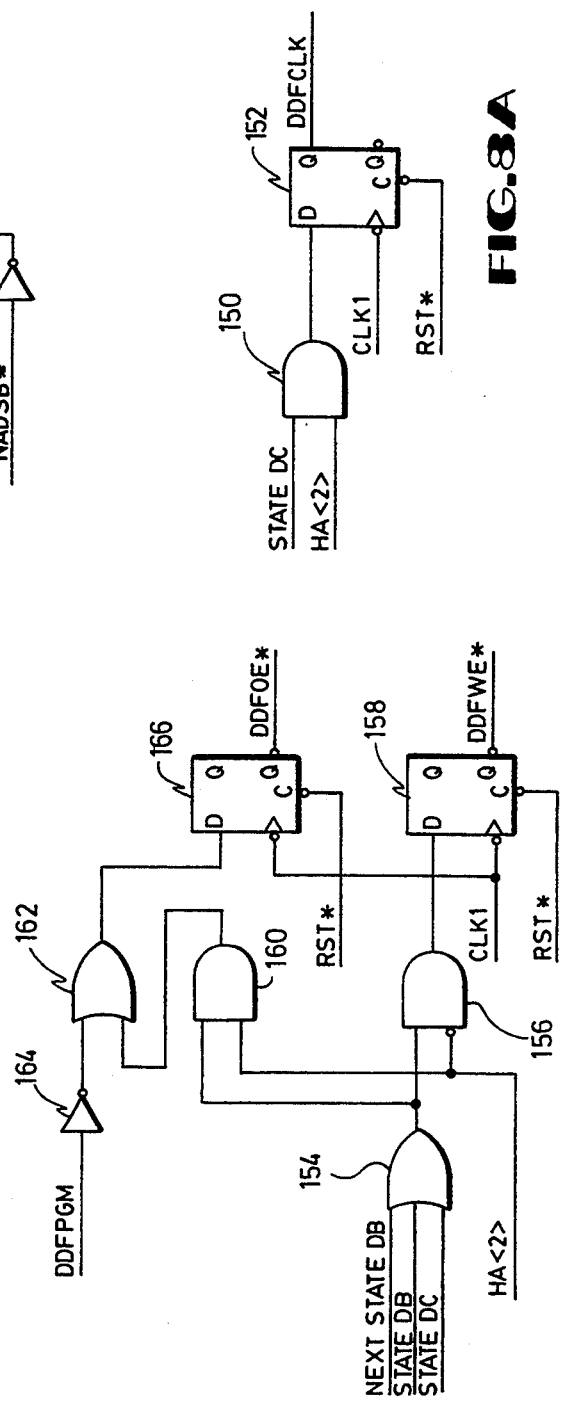
FIG. 8A is a detailed schematic diagram of circuitry associated with the state machine of FIG. 8.

Certain circuits, as shown in FIG. 8A are associated with the state machine of FIG. 8 to produce the necessary outputs from the DDF state machine logic 124. A signal indicating that the state machine is in state DC and the HA<2> signal are applied to a 2 input AND gate 150 whose output is connected to the D input of a D-type flip-flop 152. The inverted clocking input of the flip-flop 152 is connected to the CLK1 signal and the clear input is connected to the RST* signal, which is low when the computer C is being reset. The noninverting output of the flip-flop 152 is the DDFCLK signal, which is produced a certain number of CLK1 signal cycles after the start of a DDFPGM memory data write operation where the HA<2> signal is high for DDF RAM 126 reading.

Three signals referred to as the next state DB, state DB and state DC signals, which indicate that the next state of the state machine is state DB or the state is state DB or DC are connected as inputs to a 3 input OR gate 154, whose output is connected as one input of a two input AND gate 156. The second input to the AND gate 156 is inverted and has connected to it the HA<2> signal. The output of the AND gate 156 is connected to the D input of a D-type flip-flop 158 whose inverted clock signal is connected to the CLK1 signal and whose clear input is connected to the RST* signal. The inverting output of the flip-flop 158 produces the DDFWE* signal. Thus the DDFWE* signal is produced a certain number of CLK1 signal cycles after the start of a DDFPGM memory data write operation where the HA<2> signal is low for DDF RAM 126 programming.

The output of the OR gate 154 is also connected to one input of a 2 input AND gate 160 whose second input is connected to the HA<2> signal. The output of the 2 input AND gate 160 is connected to one input of a 2 input OR gate whose second input is connected to the output of an inverter 164. The DDFPGM signal produced by the DDF register 122 is connected to the input of the inverter 164. The output of the OR gate 162 is connected to the D input of a D-type flip-flop 166, which has the CLK1 signal connected to an inverted clock input. The clear input of the flip-flop 166 is connected to the RST* signal. The inverted output of the flip-flop 166 is the DDFOE* signal. Thus the DDFOE* signal is produced when DDF programming is disabled for normal system operation or a certain number of CLK1 signal cycles after the start of a DDFPGM memory data write operation when the HA<2> signal is high for reading DDF RAM 126.

Figure 9:
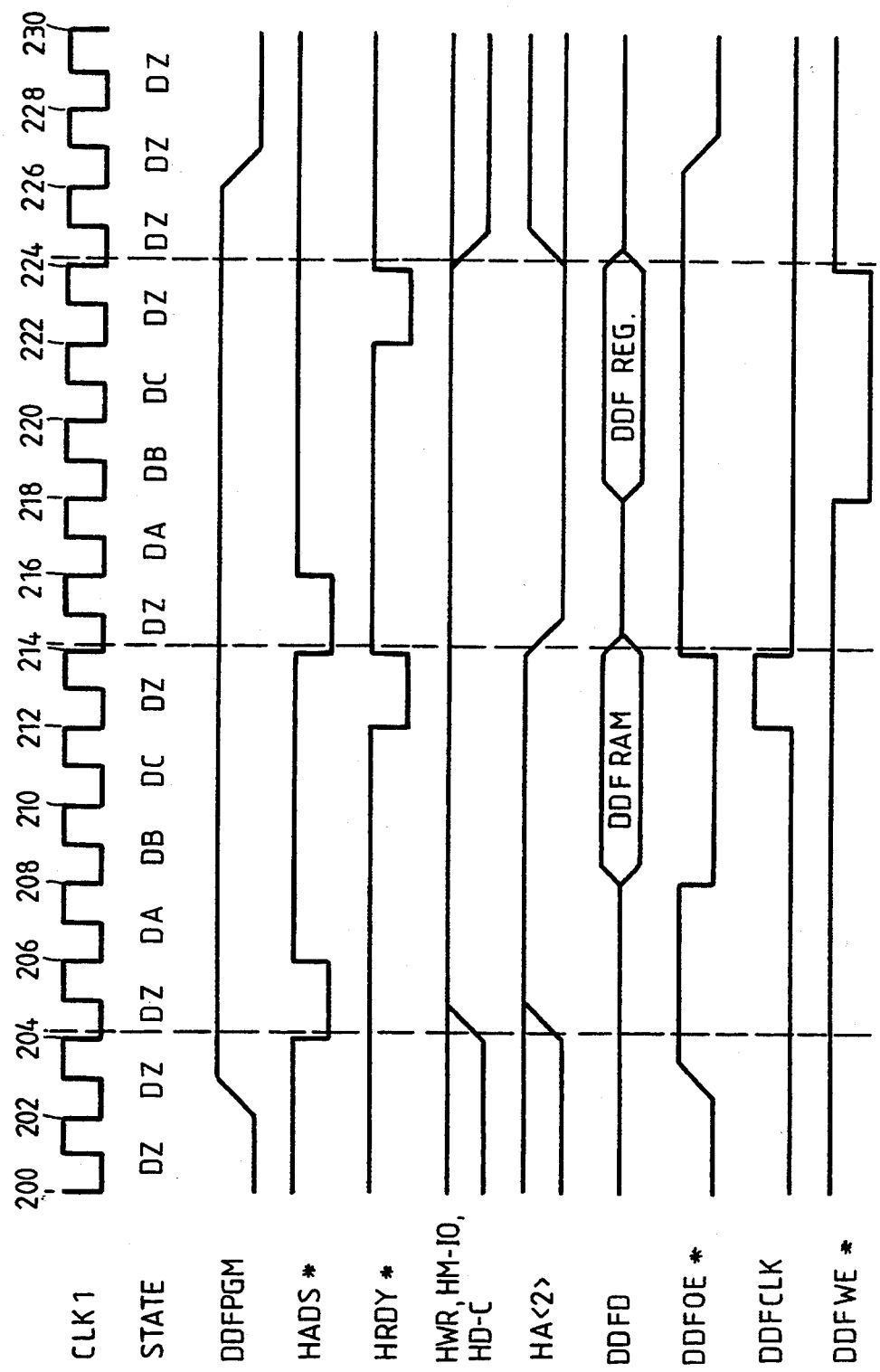
FIG. 9 is a timing diagram of various signals developed in the present invention.

The timing of the various signals of the DDF state machine logic 124 is shown in FIG. 9. Shown in FIG. 9 is one cycle where the DDF RAM 126 is read and one cycle where the DDF RAM 126 is programmed. The cycles shown are back-to-back DDF read and DDF write operations which would not occur naturally but are shown for illustrative purposes. At time 200, a falling edge of the CLK1 signal, the DDFPGM signal is considered to be low and various operations are occurring. At time 202, the next falling edge of the CLK1 signal, the state machine is stays at state DZ because the DDFPGM* signal is high. At time 202, the DDFPGM signal begins changing state as would be done after an I/O operation to the DDF register 122 setting the DDFPGM bit. Shortly thereafter, the DDFOE* signal begins a transition from a low state to a high state because DDF programming is commencing, disabling the operation of the DDF RAM 126. During DDF programming the DDF mapping is essentially disabled so that all memory accesses must be made out of the lower 128 kbyte block of memory or above the 256 Mbyte limits of the DDF 68 as discussed. At time 204, the next falling edge of the CLK1 signal, on which signal the DDF state machine advances, the state machine stays in state DZ because the HADS* signal was high when the edge occurred. At time 204, the DDFPGM signal is high and the HADS* signal goes low, which is an indication that a valid address is present or being presented on the host bus 46. By time 206, the next falling edge of the CLK1 signal, the HW-R, HM-IO and HD-C signals are all high, in the example indicated the HA<2> signal is high, the DDFPGM signal is high and the HADS* signal is low. Therefore on this edge the state machine advances to state DA.

At time 208, the next falling edge of the CLK1 signal, the DDFOE* signal goes low because the next state of the state machine will be state DB, because the HADS* signal is high. Therefore at time 208, the state machine advances to state DB and the DDFOE* signal goes low. Because the DDFOE* signal goes low, data produced by the DDF RAM 126 begins appearing on the DDFD<15-0> signals At time 210, the next falling edge of the CLK1 signal, the state machine is in state DB so that the DDFOE* signal stays low and the state machine proceeds to state DC. At time 212, the next falling edge of the CLK1 signal, the HRDY* signal goes low to indicate to the bus controller that the next cycle can commence and the DDFCLK signal goes high to latch the DDF data, which has been presented by the DDF RAM 126, into the DDF register 122. The data will be valid because in the preferred embodiment 20 nsec memory devices are utilized and the CLK1 signal cycle is 30 nsec. Because the state machine was in state DC, at time 212 the state machine transfers to state DZ. The DDFOE* signal stays low because state DC had been present at the falling edge of the CLK1 signal. At time 214, the next falling edge of the CLK1 signal, the completion of the DDF read operation, the DDFCLK signal goes low, the DDFOE* signal goes high, the HRDY* signal goes high and the HADS* signal goes low. The state machine stays at state DZ because the HADS* signal is high prior to the falling edge of the CLK1 signal at time 214.

Proceeding now to the DDF write operation commencing at time 216, the falling edge of the CLK1 signal, the HADS* signal goes high. The state machine proceeds to state DA because the transfer conditions are met. Also at time 216, the HA<2> signal has changed to a low value indicating that a write operation will be occurring. At time 218, the next falling edge of the CLK1 signal, the DDFWE* signal goes low and the data which is contained in the DDF register 122 is presented on the DDFD<15-0> lines. The DDFWE* signal goes low because the next state of the state machine will be state DB and the HA<2> signal is low, indicating that a DDF write operation is to occur. At time 218 the state machine advances it state DB. At time 220, the next falling edge of the CLK1 signal, the state machine advances to state DC. At time 222, the state machine advances to state DZ and the HRDY* signal goes low, indicating that the cycle is completing. At time 224, the next falling edge of the CLK1 signal, the DDFWE* signal goes high, which causes the DDF RAM 126 to latch in the values which have been presented on the DDFD<15-0> lines. The HRDY* signal goes high and the next appropriate cycle is performed by the computer system C. The state machine stays in state DZ until the next DDF programming cycle is to be started.

Figure 3:
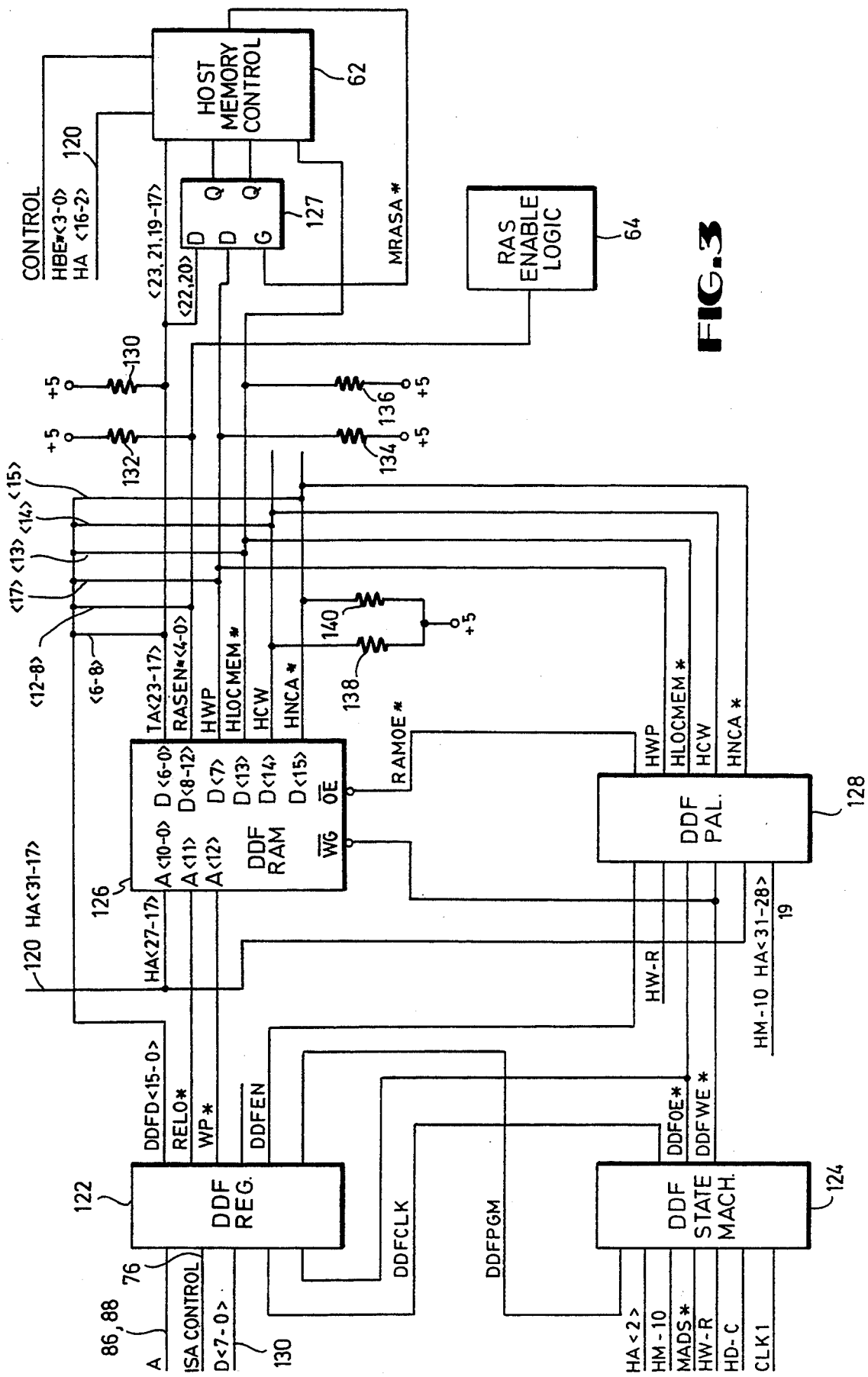
FIG. 3 is a more detailed schematic block diagram of circuitry incorporating the present invention.
Figure 4:
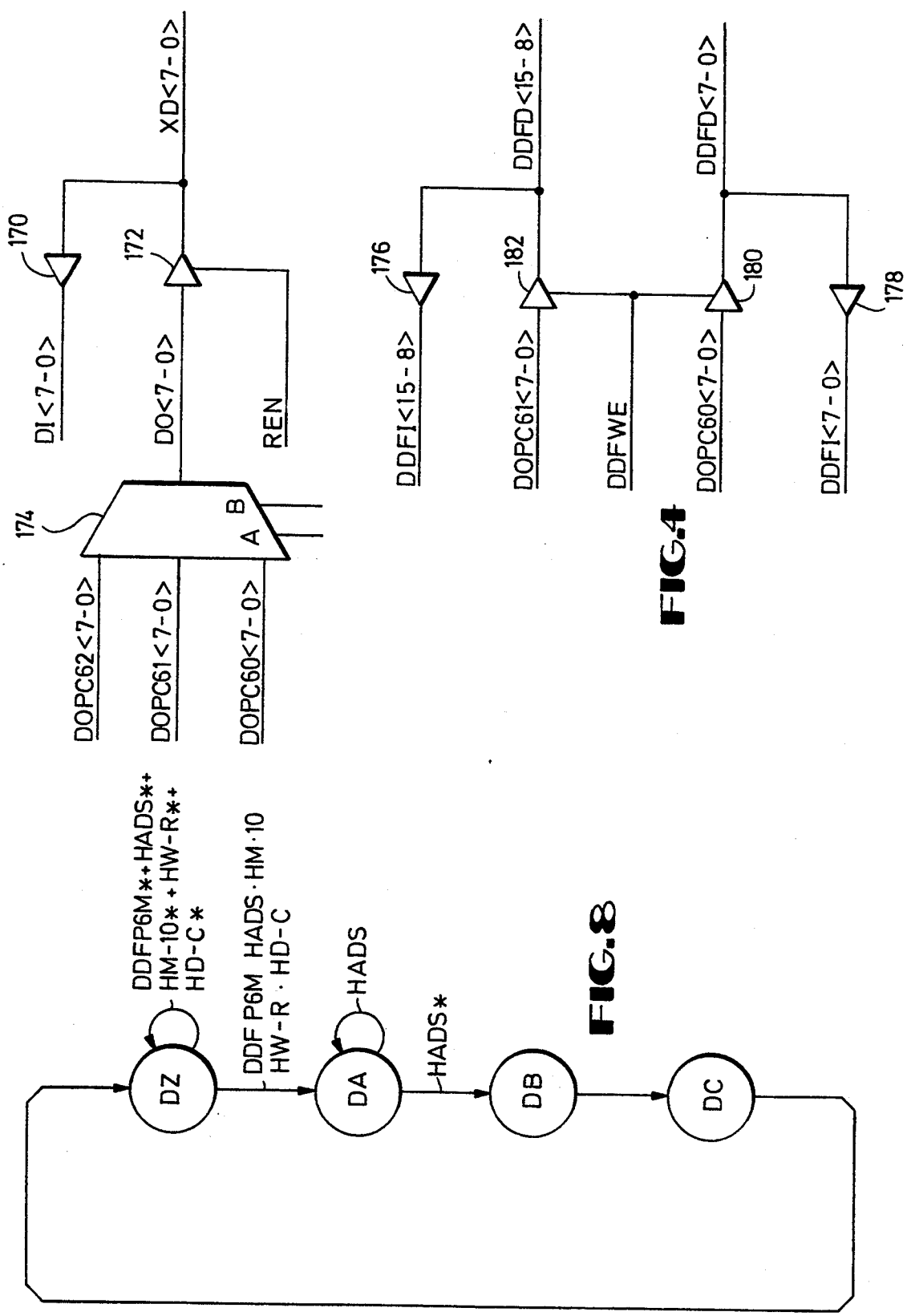
FIGS. 4–7 are detailed schematic diagrams of portions of the circuitry of FIG. 3.

The DDF register 122 contains three I/O port addresses, ports 0C60, 0C61 and 0C62 and contains memory address 80C00000. I/O port 0C62 is the addressable location of the DDFPGM and DDFEN bits, while I/O ports 0C60 and 0C61 are the 16 bits forming the location of the DDF data. The memory address 80C00000 is the location of a register which in previous systems included the relocation and write protect bits. These bits are retained for compatibility reasons. The DDF register 122 is connected to the XD<7-0> lines (FIGS. 3 and 4). An internal bus referred to as the DI<7-0> signals is developed by a series of buffers 170 connected to the XD<7-0> lines. This provides the internal data input bus for use in the DDF register 122. Data is driven to the XD<7-0> lines by the DDF register 122 by means of output buffers 172 whose inputs are connected to the D0<7-0> lines and whose tri-state controls are connected to the REN signal. The REN signal is a signal which indicates that a read is being enabled from the DDF register 122 to the processor 20 and therefore the signal has appropriate timing to properly place data onto the XD<7-0> lines. The D0<7-0> lines are produced by a multiplexer 174 which, for purposes of this embodiment, has 3 inputs, the DOPC60<7-0>, DOPC61<7-0> and DOPC62<7-0> lines, which respectively refer to the 8 output bits of the appropriate I/O port register. Selection of the multiplexer 174 is as necessary based on the address of the I/O port being requested by the processor 20.

The DDFD<15-0> lines form a bi-directional bus and therefore appropriate buffering is necessary for connection to the DDF register 122. Buffers 176 and 178 are used to couple the DDFD<15-8> and DDFD<7-0> lines to the DDFI<15-8> and DDFI<7-0> signals. The DDFI signals are the internal DDF input signals which are latched during a DDF read operation for presentation to the processor 20. The DOPC60<7-0> signals are connected to the inputs of output tri-state buffers 180 whose outputs are connected to the DDFD<7-0> signals. The DOPC61<7-0> signals are connected via buffers 182 to the DDFD<15-8> lines. The output enable input of the buffers 180 and 182 is provided by the DDFWE signal, so that the appropriate 16 bits can be written out from the register to the DDF RAM 126 during DDF write operations.

Figure 5:
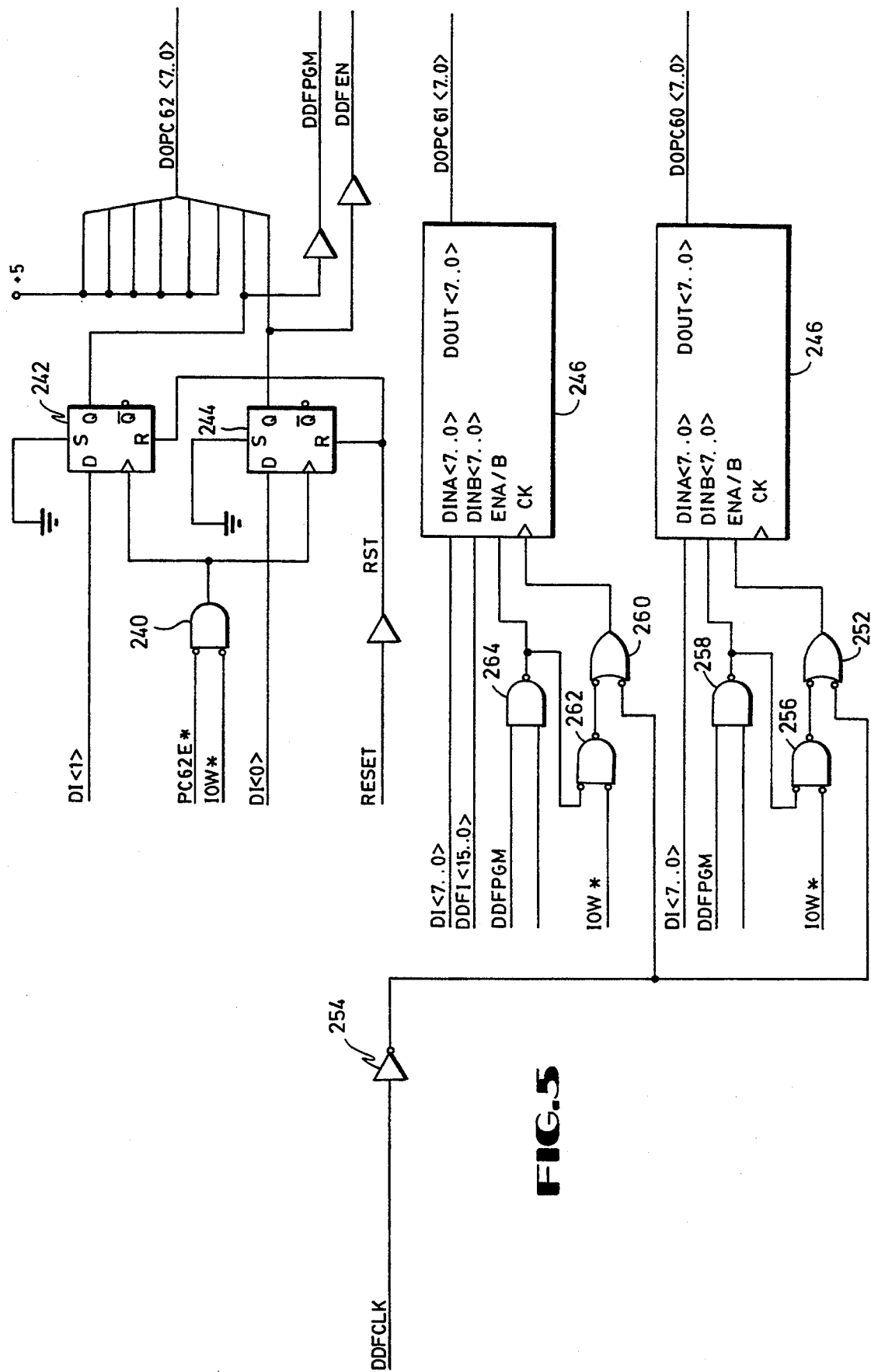

Detailed construction of the I/O port C62 register is shown in FIG. 5. A signal PC62E*, which indicates that an address decode for I/O port C62 has been received, and a signal IOW*, which indicates that an I/O write operation is being requested, are supplied as inputs to a 2 input NOR gate 240. The output of the NOR gate 240 is provided to the clocking inputs of 2 D-type flip-flops 242 and 244. Flip-flop 242 is the DDFPGM flip-flop, while flip-flop 244 is the DDFEN flip-flop. Connected to the D input of the DDFPGM flip-flop 242 is the DI<1> signal, while the D input of the DDFEN flip-flop 244 has the DI<0> signal connected. The noninverting outputs of the 2 flip-flops are then respectively the DDFPGM and DDFEN signals, through buffering if necessary. The clear or reset inputs to the two flip-flops 242 and 244 are connected to the RST signal so that the values are low upon system reset. The outputs of the two flip-flops 242 and 244 are also designated as the DOPC62<1-0> signals, with the remaining signals of DOPC62<7 2> being tied to a high level so that the I/O port C62 can be read as well as written.

Figure 6:
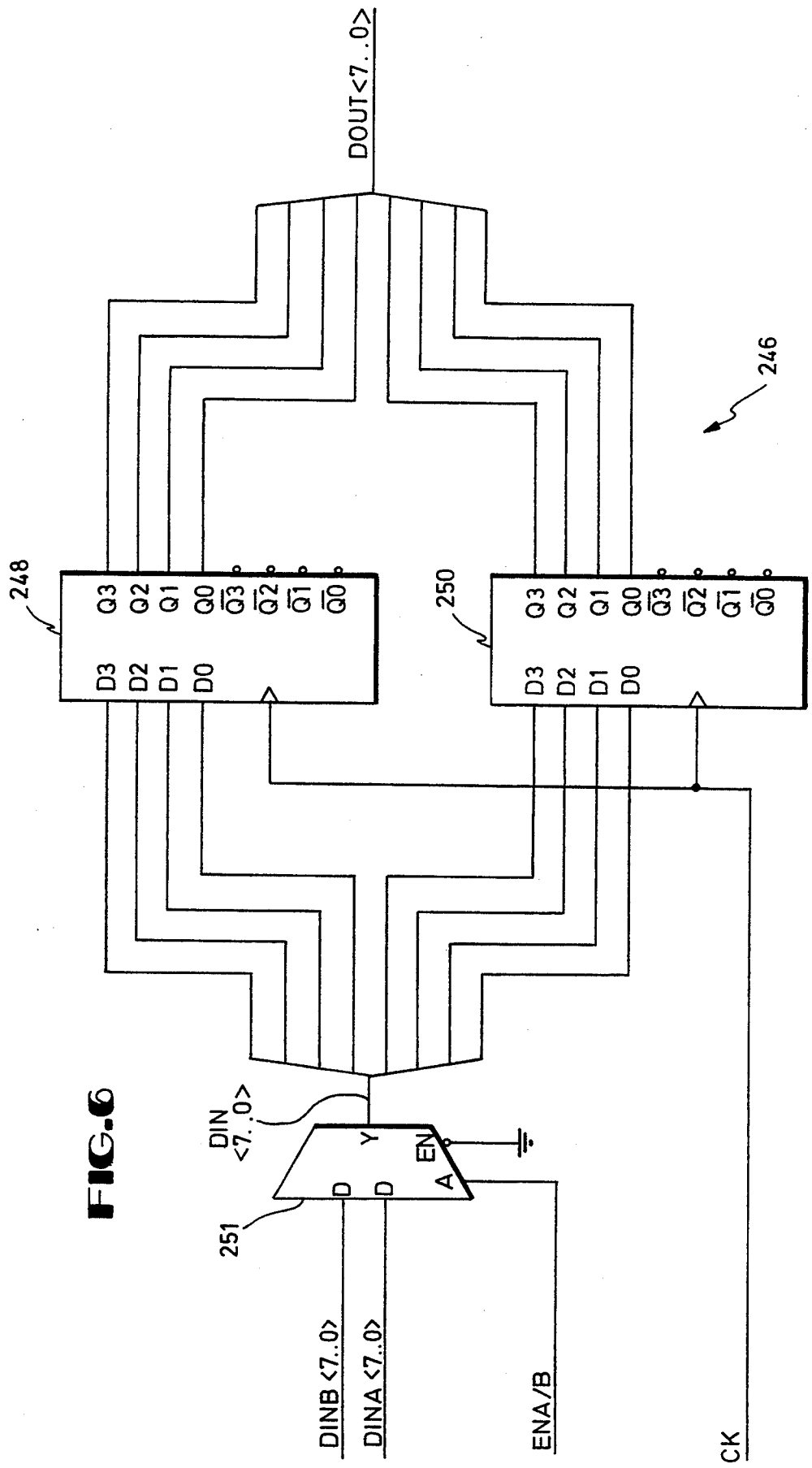

The registers forming I/O ports C61 and C60 are contained in two identical register blocks 246 (FIGS. 5 and 6). The register block 246 contains two 4 bit D-type flip-flops 248 and 250. The clocking inputs to both flip-flops 248 and 250 are connected to a signal referred to as CK. The 8 outputs of the 2 flip-flops 248 and 250 form the DOUT<7-0> signals, while the 8 D inputs form the DIN<7-0> signals. The DIN<7-0> signals are connected to the output of an 8 bit wide multiplexer 251 whose inputs are the DINB<7-0> and DINA<7-0> signals. The selection of the multiplexer 251 is controlled by a signal referred to as ENA/B.

The I/O port C60 register is formed by connecting the DI<7-0> lines to the DINA<7-0> signals and the DDFI<7-0> signals to the DINB<7-0> signals of one register 246. The DOUT<7-0> outputs of that register are designated the DOPC60<7-0> signals. The clocking signal for the register 246 is provided by the output of a 2 input NAND gate 252, one of whose inputs is the DDFCLK* signal, which is provided by an inverter 254. The second input to the NAND gate 252 is provided by the output of a 2 input OR gate 56, one of whose inputs is the IOW* signal and whose other input is connected to the output of a 2 input NAND gate 258. The output of the 2 input NAND gate 258 is also connected to the ENA/B input of the register 246. The 2 inputs to the NAND gate 258 are the DDFPGM signal and a signal referred to as PC60EN, which indicates that an address value of C60 is present on the address bus. Thus, the combination of latch 246, and the gates 252, 256 and 258 form the C60 register.

To form the I/O port C61 register the DI<7-0> lines are connected to the DINA<7-0> lines of the register 246, while the DDFI<15-8> lines are connected to the DINB<7-0> lines, with the DOUT<7-0> signals being connected to the DOPC61<7-0> signals. The CK input to register 246 is provided again by the output of a 2 input NAND gate 260, one of whose inputs is connected to the DDFCLK* signal, with the other input connected to the output of a 2 input OR gate 262. One of the inputs to the OR gate 262 is the IOW* signal and the other input signal is connected to the output of a 2 input NAND gate 264. The output of the NAND gate 264 is also connected to the ENA/B input of the register 246. The 2 inputs of the 2 input NAND gate 264 are the DDFPGM signal and the PC61EN signal, which indicates that I/O address C61 is being presented.

Thus, if data is being written to the DDF register 122 by the processor 20, the ENA/B signal is in the A position so that the values being presented by the processor 20 are latched into the appropriate register 246, while if the data contained in the DDF RAM 126 is being stored as in a DDF read operation, then the B direction of the multiplexer is accessed and the DDFI lines are stored in the registers 246.

Figure 7:
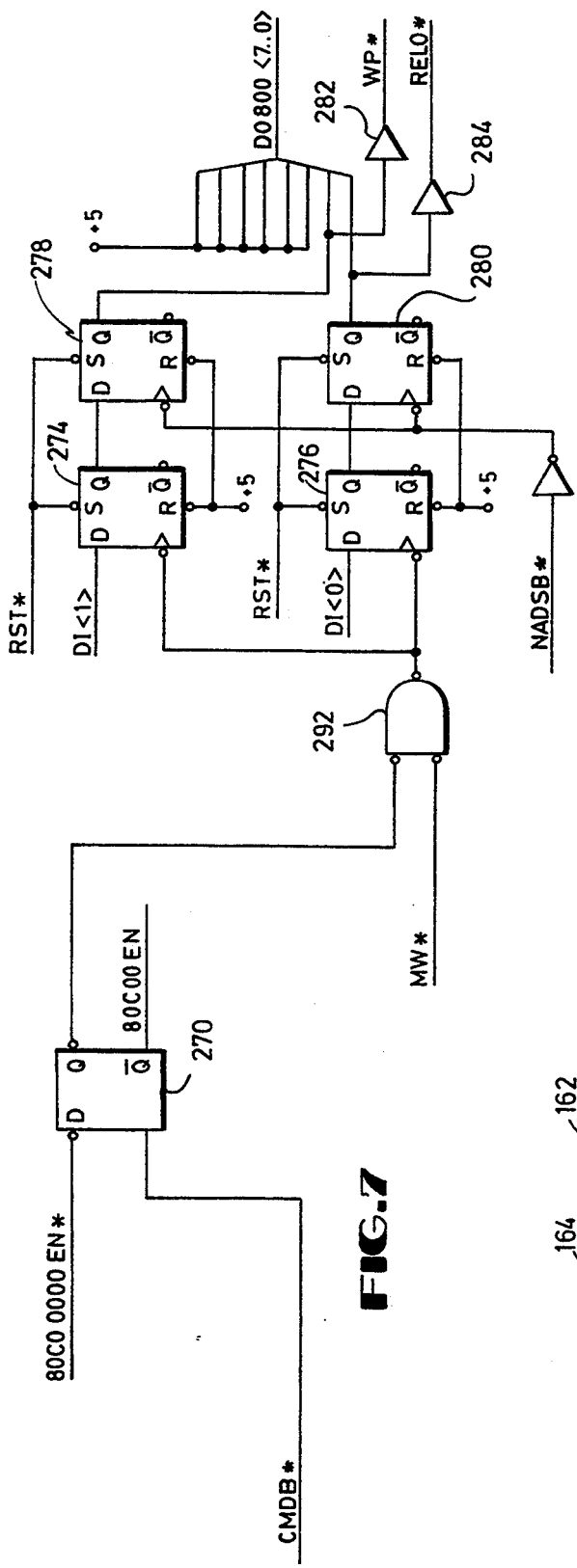

Additionally the DDF register 122 provides the RELO* and WP* signals. Circuitry to perform this function is shown in FIG. 7. A latch 270 is used to indicate whether the 80C00000 address has been presented. Connected to the D input is a signal referred to as 80C00000EN*, which indicates that the appropriate address is being presented on the address bus. The latch gate signal is the CMDB* signal, which is a buffered version of the CMD* signal which is present on the EISA bus and has timing suitable to latch the valid state of the 80C00000EN* signal. The noninverting output of the latch 270 is connected to 1 input of a 2 input OR gate 272, whose other input is the MW* signal, which indicates that a memory write operation is occurring. The output of the OR gate 272 is connected to the inverted clock inputs of 2 D-type flip-flops 274 and 276. The D inputs of flip-flops 274 and 276 are connected respectively to the DI<i> and DI<0> signals The noninverting outputs of the 2 flip-flops 274 and 276 are connected respectively to the D inputs of 2 D-type flip-flops 278 and 280. The inverted clocking inputs to the 2 flip-flops 278 and 280 are connected to a signal referred to as NADBS*, which has a timing such that the WP* and RELO* signals are output at a time that does not interfere with active addresses on the DDF RAM 126 or cause cache coherency problems. The preset or set inputs to the 4 flip-flops 274, 276, 278 and 280 are connected to the RST* signal. The output of the flip-flop 278 is connected to a buffer 280 whose output is the WP* signal. The output of the flip-flop 280 is connected to a buffer 284 whose output is the RELO* signal. Additionally, the outputs of the 2 flip-flops 278 and 280 are the bit position 1 and bit position 0, respectively, of the D80C0<7-0> signals which are actually multiplexed back to the system to allow the 80C00000 register to be a read-write register.

The DDF PAL 128 implements the following equations:

```
HLOCMEM = DDFPGM • HM-IO • HW-R
HLOCMEM.3SENABLE* =
   DDFEN* • DDFPGM* • HM-IO • HA<19>* • HA<31>*
    • HA<30>* • HA<29>* • HA<28>*
  + DDFEN* • DDFPGM • HM-IO • HW-R • DDFWE
  + DDFEN* • DDFPGM • HM-IO • HW-R* • HA<19>*
  + DDFEN • DDFPGM* • HM-IO • HA<31>*
    • HA<30>* • HA<29>* • HA<28>*
  + DDFEN • DDFPGM • HM-IO • HW-R • DDFWE
  + DDFEN • DDFPGM • HM-IO • HW-R* • HA<31>*
    • HA<30>* • HA<29>* • HA<28>*
  +DDFPGM • HM-IO • HW-R • DDFOE
RAMOE = DDFEN* • DDFPGM* • HM-IO • HA<19>*
    • HA<31>* • HA<30>* • HA<29>* • HA<28>*
  + DDFEN* • DDFPGM • HM-IO • HW-R • DDFOE
  + DDFEN • DDFPGM* • HM-IO • HA<31>*
    • HA<30>* • HA<29>* • HA<28>*
  + DDFEN • DDFPGM • HM-IO • HW-R • DDFOE
  + DDFEN • DDFPGM • HM-IO • HW-R*
    • HA<31>* • HA<30>* • HA<29>*
    • HA<28>*
HWP* = DDFPGM
HWP*.3SENABLE = RAMOE • DDFWE*
HCW* = DDFPGM*
HCW*.3SENABLE = RAMOE • DDFWE*
HNCA = DDFPGM
HNCA.3SENABLE = RAMOE • DDFWE*
```

Thus, the HWP, HCW and PINCA* signals are driven only during intervals when the DDF RAM 126 output is disabled and a DDF write operation is not occurring. The RAMOE* signal is active or low under five possible conditions. If the DDF 68 is not enabled and the programming mode is not active, then the DDF RAM 126 provides outputs only to a minimum amount of memory which is utilized during initialization operations. If the DDF 68 is disabled and programming mode is engaged, then the DDF RAM 126 is enabled only during DDF read operations. When the DDF function is enabled and programming mode is disabled, this is the normal state for operations and so the RAMOE* signal goes low during memory operations to addresses less than 256 Mbytes. Finally, if the DDF is enabled and programming mode is enabled, then the RAMOE* signal is low for DDF read operations or for memory read operations which occur at addresses less than the 256 Mbyte boundary. The RAMOE* signal is always high when the HCANCEL signal is received, thus allowing the DDF PAL 128 to drive the HLOCMEM* signal for all addresses.

The HLOCMEM* signal is used to indicate to the host memory controller 62 and other circuitry in the computer C, for example the bus controller 48, that the local memory will be responding or that DDF cycles are occurring, so that EISA bus cycles need not be performed. The HLOCMEM* signal is normally driven by the DDF RAM 126, but is produced by the DDF PAL 128 under certain conditions. Because the signal provided by the DDF PAL 128 is provided by a tri-state driver, the data value can be present at the internal driver and yet not be appearing on the output of the DDF PAL 128 because the device is tri-stated. The internal value of the HLOCMEM signal is high during memory write operations when the DDF program bit is set. However, this value is translated to the HLOCMEM* signal driven by the DDF PAL 128 only when the tri-state drivers are enabled.

There are four possible conditions generally relating to DDF enablement and programming mode operation where the HLOCMEM* signal is of interest. If the DDF 68 is disabled and the program mode data bit is not set, then the HLOCMEM* signal is driven high by the DDF PAL 128, except when the HA<19> signal is low, at which time the HLOCMEM buffer is tri-stated and no signal is driven by the DDF PAL 128. When the DDF is not enabled and programming mode is activated, then the HLOCMEM buffer is tri-stated during memory write operations when either the DDFOE* or DDFWE* signals are active low or when doing a memory read and HA<19> equals 0. If the HLOCMEM* signal is being driven, it is being driven high in all cases except for those that are memory write cycles, which allows the computer system C to insure that the DDF programming cycle will be run as a local cycle and that the bus controller 48 will not handle the cycle. There is no conflict in these statements because the DDFOE* and DDFWE* signals do not appear until after the bus controller 46 has sampled the HLOCMEM* signal, which then changes state shortly thereafter if DDFOE* or DDFWE* go low. If the DDF is enabled and the programming mode is not set, then the HLOCMEM signal provided by the DDF PAL 128 is tri-stated for all memory cycles for addresses below 256 Mbytes. For addresses above 256 Mbytes, the HLOCMEM signal is actually driven by the DDF PAL 128 and is driven high. If the DDF programming is enabled and the DDF 68 is enabled, then the HLOCMEM* signal is tri-stated during memory write operations during when either of the DDFOE* or DDFWE* signals go active and during memory read operations below 256 Mbytes. If the HLOCMEM* signal is driven, it is driven high in all cases except for memory write cycles. By driving it low during the memory write cycle, the DDF programming cycles are run as local cycles and the bus controller 48 will not take control.

Figure 11B:
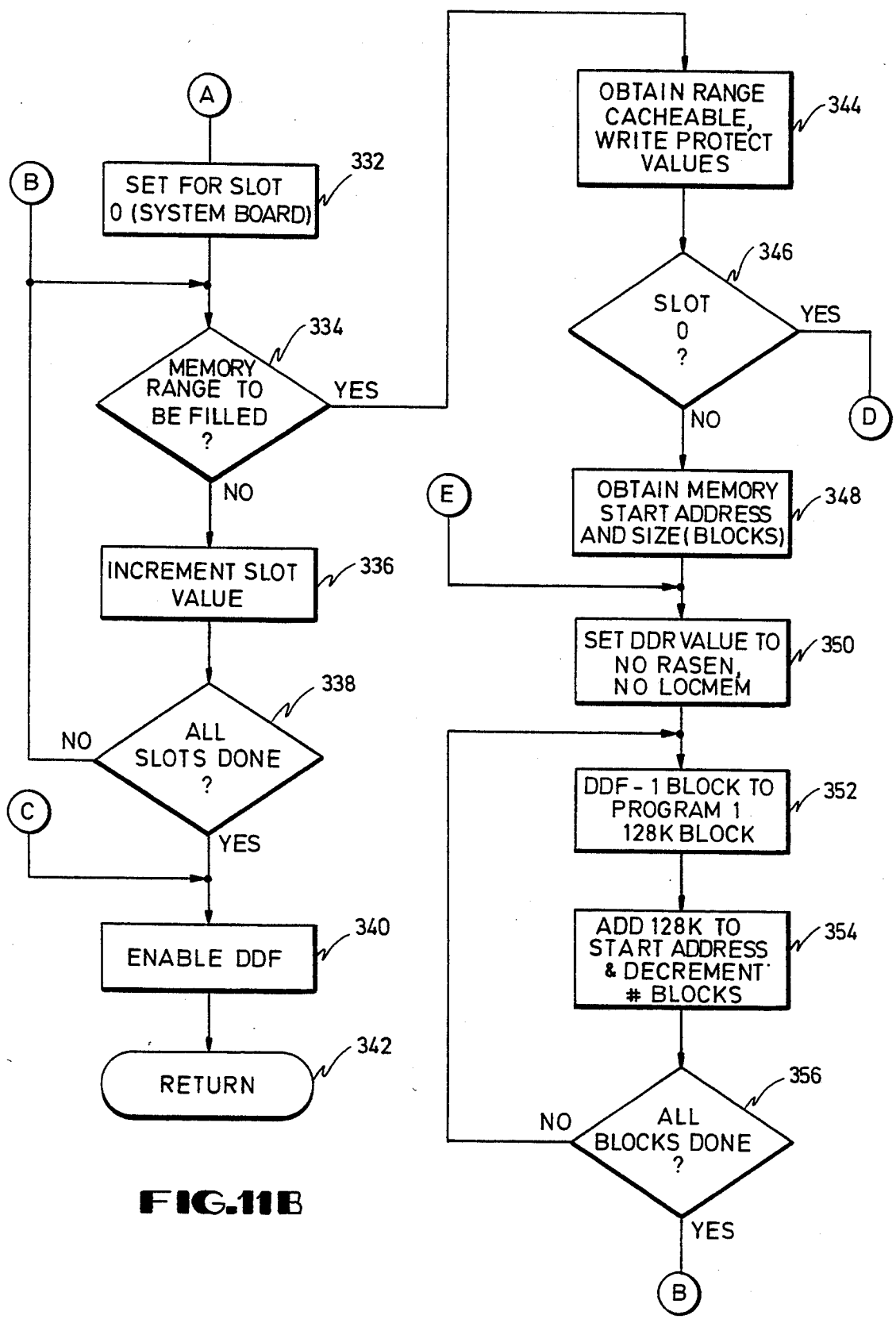
Figure 18:
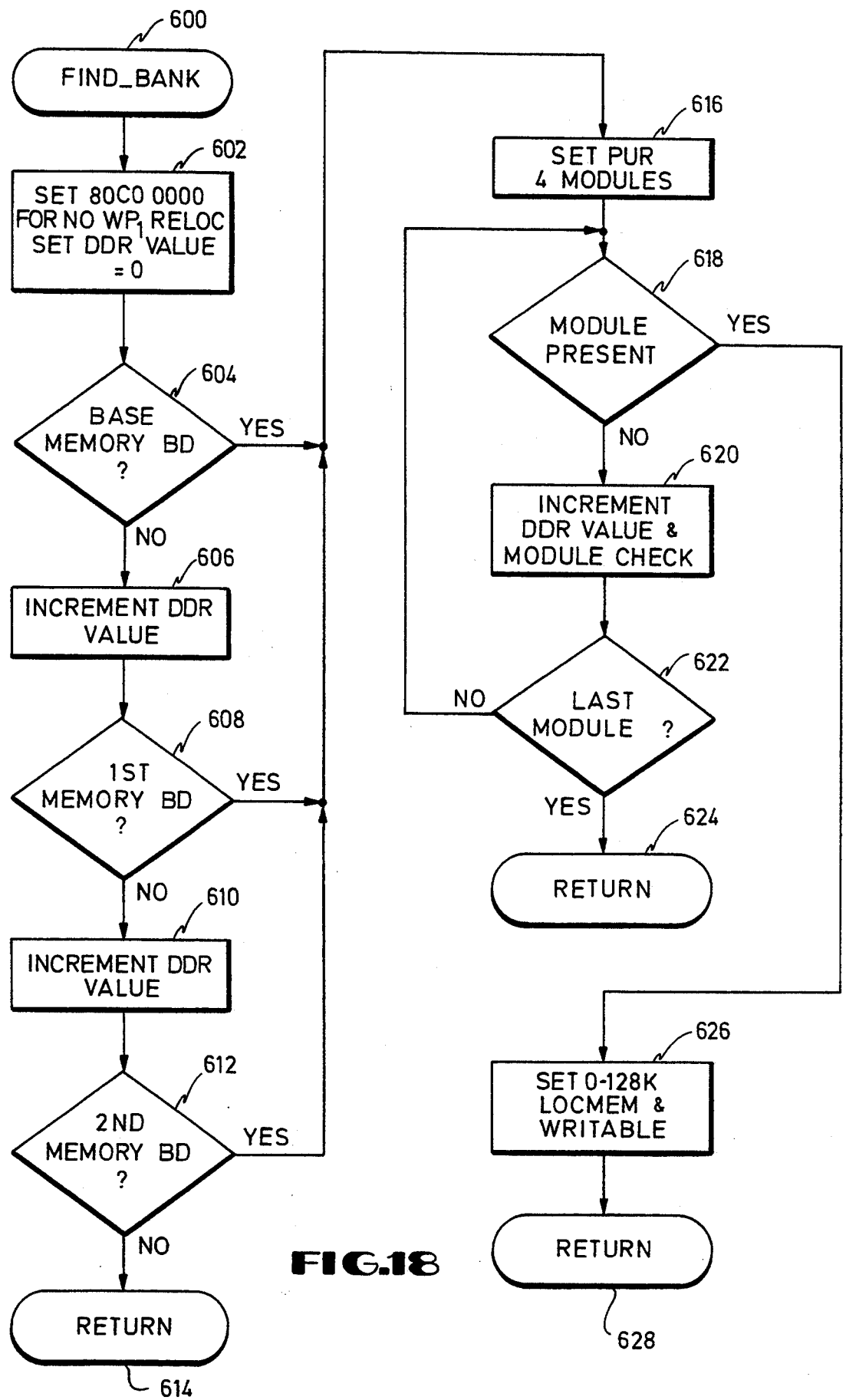

Because the DDF data is contained in a RAM, it is necessary to program the RAM after powerup or reset of the system. It is also desirable that the RAM be programmable during other periods to allow users to vary their system design. A sequence suitable to be used during the power on self-testing (POST) portion in the initialization of the computer system C is the PROGRAM DDF sequence 300 (FIG. 11A). The PROGRAM DDF sequence 300 commences at step 302 where the first bank of the first memory module is set up to be local memory and writable for the first 128 kbyte block by using the FIND_BANK sequence 600 (FIG. 18). This operation thus sets up a minimum amount of RAM for utilization during the initialization sequences if a module is present. In step 304, the data destination register (DDR) value which is stored in the computer C is set to noncacheable, writable, external memory mode and an address pointer is set to point to the beginning of the second 128 kbyte block. Control proceeds to step 306, where a subroutine called ACCESS_DDF 500 (FIG. 16) is called which performs the actual programming of the DDF values to the address indicated by the address pointer. In step 306, this operation is performed for all four of the 80C00000 values of interest. Control then proceeds to step 308, where 128 kbytes is added to the address pointer to address the next address block. In step 310 a determination is made as to whether 256 Mbytes, the limit of the DDF facility in the preferred embodiment, has been programmed to this default value. If not, control returns to step 306 and the default programming continues. If all of the 256 Mbytes have been completed so that the DDF RAM 126 is loaded with default values, effectively disabling the main memory except for the first 128 kbyte block, then control proceeds to step 312 where the actual configuration of the installed memory modules is determined. The location and sizes as previously discussed are determined for use in the programming the DDF RAM 126. This information is obtained by reading information available from the memory boards and modules. Control proceeds to step 314, where a determination is made to see if the system configuration information, which is contained in CMOS memory, is valid. The system configuration information contains information such as where bad memory blocks are located, how much memory is actually installed in the system, logical address ranges of the memory and various characteristics of the memory.

Figure 15:
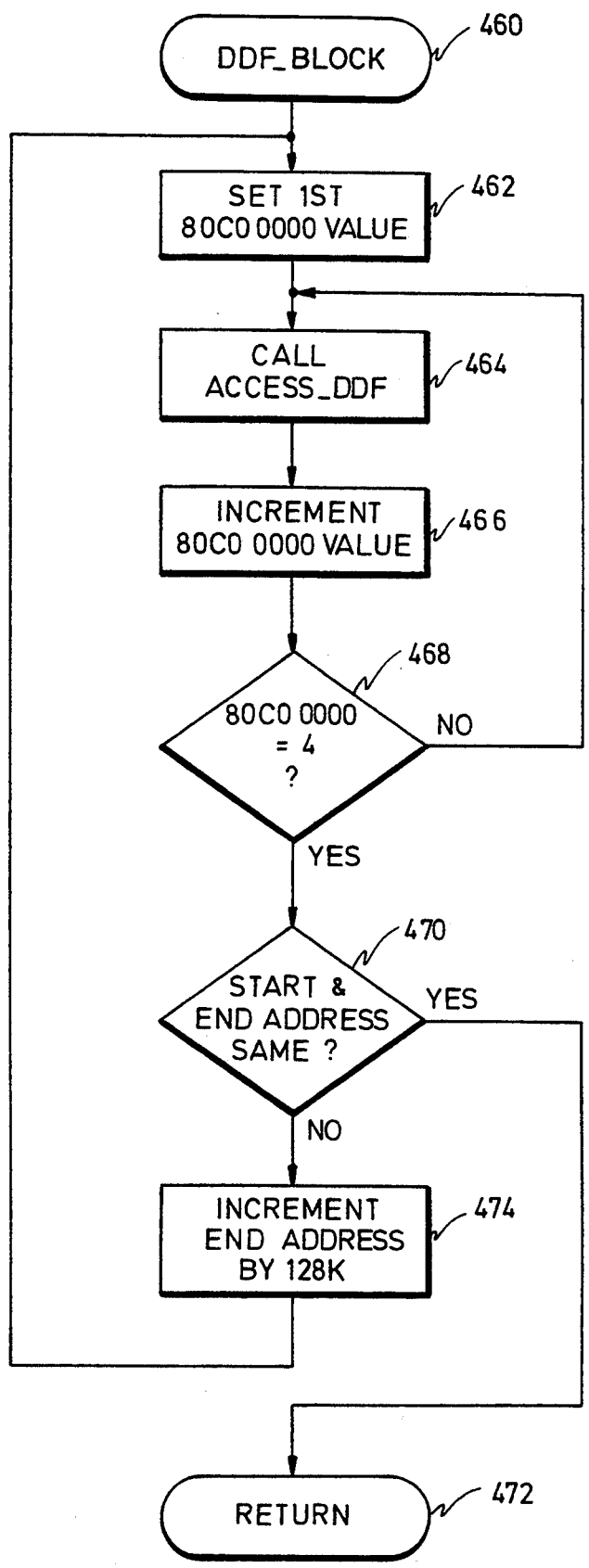

If the configuration information is not valid, a default memory configuration must be programmed, so control proceeds to step 316 where a data destination register (DDR) value which addresses the first bank in the first module the first bank and the memory is writable and local is developed. In step 318, the address pointer is moved to point to the second 128 kbyte block with an ending address pointer set up so that an additional 512 kbytes of memory is programmed with the desired preset DDF values, resulting in 640 kbytes base memory available to the user. The programming operation is performed in step 320 by a call to the DDF_BLOCK sequence 460 (FIG. 15), which programs in values for all four possible values of bits zero and one of 80C00000.. In step 322 the 256 kbyte block starting at address FA00000 is developed and the DDR value is incremented, so that this memory space is available for the user. The appropriate DDR value is programmed in using the DDF_BLOCK sequence 460 in step 324. Finally, in step 326, a final 128 kbyte block is developed by incrementing the DDR value and calling the COMB_BLOCK routine 400 (FIG. 12) which programs a single 128 kbyte block to be used for the RAM copy of the ROM. Thus, 640 kbytes of base memory and 384 kbytes of system memory has been programmed. Control proceeds to step 328 where the DDF enable bit is set, thus activating the DDF section. Control proceeds to step 330 which is a return to the calling routine.

If, in step 314, it was determined that the system configuration information was valid, control proceeds to step 332 (FIG. 11B) where a pointer is set to indicate slot 0, which is the system board in the preferred embodiment. This slot counter is to be utilized in checking through the various information stored in the system configuration information to find information relating to the RAM that is present in the system. Control proceeds to step 334 where a determination is made if there is a memory range to be filled in that particular slot. If not, control proceeds to step 336 where the slot value is incremented to proceed to the next possible slot. In step 338, a determination is made if all of the slots have been evaluated. If not, control returns to step 334. If all of the slots have been evaluated, then control proceeds to step 340, where the DDFEN bit is set, thus enabling the DDF function. Control proceeds to step 342 for a return to the calling sequence.

Figure 13:
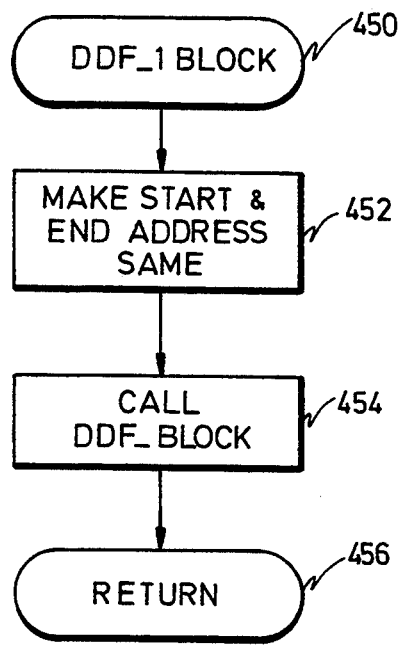

If in step 334 it was determined that there was a memory range to be filled, control proceeds to step 344 where the sequence determines the memory range, the cacheable status and the write protect values for that particular range. In step 346, a determination is made as to whether slot 0 is the active slot. This is necessary because all non-slot 0 memory is considered to be external memory. If slot 0 is not being analyzed, control proceeds to step 348 where the memory starting address and number of 128 kbyte blocks in the particular memory range is determined. Control proceeds to step 350 where the DDR value is set to indicate that there is no local memory and no RASEN* signals are to be made low. This insures that the memory cycle is handled by the bus controller 48 and goes to the EISA bus 46 or the X bus 90. Control proceeds to step 352 where the DDF_1BLOCK sequence 450 (FIG. 13) is called to program a single 128 kbyte block into the DDF RAM 126. Control proceeds to step 354 where a 128 k value is added to the starting address and the number of blocks is decremented. In step 356 a determination is made as to whether all blocks have been programmed. If not, control returns to step 352 for programming the next block. If so, control proceeds to step 334 to find the next memory range for that particular slot.

Figure 11C:
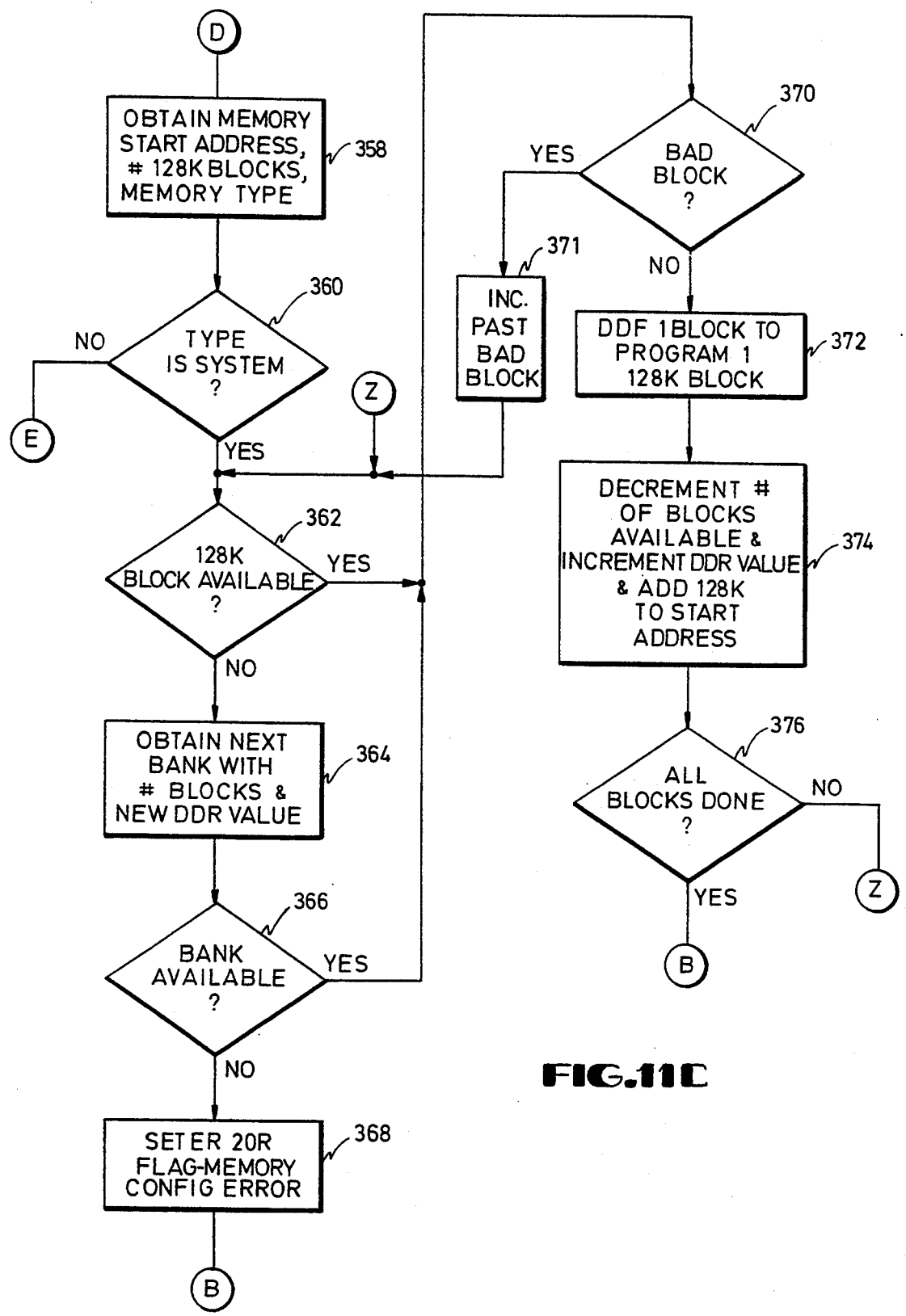

If, in step 346, it was determined that slot 0 was being programmed then control proceeds to step 358 (FIG. 11C) where the memory starting address and the number of 128 kbyte blocks and the memory type is obtained. In step 360 a determination is made if the memory type is system memory. If not, control proceeds to step 350 because non-system memory located on the system board or main memory board is not considered to be local memory. If the memory type is system memory, control proceeds to step 362 where it is determined if a 128 kbyte block is available for programming. If not, control proceeds to step 364 where the next bank of memory is obtained, with the number of blocks available, and a new base DDR value is written to address the new bank. Control then proceeds to state 366 to see if a bank is available. If a bank was not available, control proceeds to step 368 where an error flag is set which indicates that there has been a memory configuration error. Control then proceeds to step 334.

If there were blocks available at step 362 or a bank was available at step 366, control proceeds to step 370 where a determination is made by checking the configuration information as to if this is a bad block of memory by calling the MAP_OUT_BLK sequence 550 (FIG. 12). If so, control proceeds to step 371 where the DDR value is incremented past the bad block. Control then returns to step 362 to see if another block is available. If it is not a bad block, control proceeds to step 372 where the DDF_1BLOCK sequence 450 is called to program one 128 k block with the DDR value that has been set at the starting memory address which has been programmed. In step 374 the number of blocks available is decremented, the DDR value is incremented and 128 k is added to the starting address. Control then proceeds to step 376 where a determination is made as to whether all of the blocks have been programmed. If not, control returns to step 362. If so, control proceeds to step 334 to see if any more memory ranges are to be filled.

The COMB_BLOCK sequence 400 (FIG. 12) is used to properly set the DDF values when the BIOS remapping and RAM write protection is taking place. As discussed in the background of the specification, it is desirable to remap the ROM-based BIOS into high speed 32 bit RAM when the processor is an 80386 or greater. This is because the BIOS ROM is located on the relatively slow X bus 90 and is only 16 bits wide. Thus if access has to be made to the ROM this would slow down the processor operation. By copying the information from the ROM into RAM and then changing the address map of the RAM so that any ROM accesses go to the newly remapped RAM area, system operation speed is increased. The COMB_BLOCK sequence 400 commences at step 402 where the 80C00000 value stored by the processor 20 is set to 0. In step 404, the relocation address is loaded. In step 406, the write protect bit is set in the DDR value so that the relocated BIOS values cannot be written to. In step 408, the ACCESS_DDF sequence 500 is called to set the appropriate DDR value into the DDF location. In the next step, step 410, the high RAM address is loaded for a mapping of the BIOS ROM. In step 412, the ACCESS_DDF sequence 500 is again called to program that particular location. In step 414, the 80C00000 value is incremented to program the next option. In step 416, the ACCESS_DDF sequence 500 is called to program this version of the high RAM address. In step 418, the 80C00000 value is once again incremented. In step 420 the write protect bit in the DDR value is cleared, so that in step 422 the value can be written using the ACCESS_DDF sequence 500. In step 424, the relocation address is again reloaded and the DDF RAM 126 is loaded by the ACCESS_DDF sequence 500 in step 426. In step 428, the 80C00000 value is incremented to the final value and in step 430 the high RAM address is loaded, so that when the ACCESS_DDF sequence 500 is called at step 432 the final DDF location is programmed. In step 434 control returns to the calling sequence. After the sequence is completed, the two least significant bits in memory address 80C00000 having the meanings as shown in the following table.

| Meaning | 80C00000 BIT 0 | BIT 1 |
|---|---|---|
| Write Protect and Relocated ROM to RAM | 0 | 0 |
| Write Protect RAM | 0 | 1 |
| Relocate ROM to RAM | 1 | 0 |
| No Write Protection or Relocation | 1 | 1 |

The DDF_1BLOCK sequence 450 (FIG. 13) is used to program one 128 kbyte block located at the starting memory address with the saved DDR value. The DDF_1BLOCK sequence 450 starts at step 452 where the starting and ending memory addresses are made the same. In step 454 the DDF_BLOCK sequence 460 is called to program the DDF RAM 126. In step 456, control returns to the calling sequence.

The DDF_BLOCK sequence 460 commences at step 462 where the first 80C00000 value of 0 is set. Control proceeds to step 464 where the ACCESS_DDF sequence 500 is called to program this particular DDF RAM 126 location, as specified by the starting address, with the DDR value. In step 466, the 80C00000 value is incremented. In step 468, a determination is made as to if the 80C00000 value is equal to 4. If it is not, control returns to step 464 so that all 4 values of interest are programmed. If the value is equal to 4, control proceeds to step 470, where a determination is made as to whether the start and end memory addresses are the same. If so, control proceeds to step 472 which is a return to the calling sequence. If not, control proceeds to step 474, where the starting address is incremented by a 128 k. Control then proceeds to step 462 and the next 128 kbyte block in the DDF RAM 126 is programmed.

The ACCESS_DDF sequence 500 (FIG. 16) commences at step 502 where the six high bits in the 80C00000 value are set to 1. This value is then written to the 80C00000 memory register to properly set that location, with the lower two bits preserved. In step 504, the DDF programming bit is set and in step 506 the DDR value is written to the DDF register 122 at I/O port locations C60 and C61. In step 508, a memory write operation is done to the starting memory address, thus performing the desired programming operation. As discussed, if the A2 value is a 0 it is a write operation, whereas if the A2 value is a 1 it is a read operation. In step 510, the DDF register 122 is read and stored in the DDR value. In step 512, the DDF programming bit is cleared. Step 514 is a return to the calling sequence. Thus the ACCESS_DDF sequence 500 performs the necessary setting of the DDF programming bits and values to allow the values to be written to or read from the DDF RAM 126.

The MAP_OUT_BLK sequence 550 (FIG. 17) is used to check for bad memory blocks and commences at step 552 where a determination is made as to whether the desired block is located in the bad block list of the configuration information. If not, control proceeds to step 554, which is a return to the calling sequence. If the block is in the bad block list, then control proceeds to step 556, where a determination is made as to the bad block size. In step 558, the DDR value is incremented so that it is now past the bad block location and the number of blocks available is decremented by the number of bad blocks. Control proceeds to step 560 where a bad block flag is set prior to the return operation in step 554.

The FIND_BANK sequence 600 commences at step 502 where the 80C00000 value is set to indicate no write protection and no relocation of the ROM or BIOS to the RAM. Additionally in step 602 the DDR value is set to 0 to indicate the first block and the first bank. Control proceeds to step 604 where a determination is made if there is a base memory board. If there is not a base memory board the DDR value is incremented in step 606 so that the RASEN value in the DDR value is incremented past those present on the base memory board. Control proceeds to step 608 where it is determined if there is a first memory board. If there is not, control proceeds to step 610 where the DDR value is incremented past the first memory board. Control then proceeds to step 612 to determine if there is a second memory board. If not, control returns to step 614 which is a return from the sequence.

If in steps 604, 608 or 612 a memory board is found, control proceeds to step 616 where a counter is set to look for four potential modules. Control proceeds to step 618 to determine if a module is present at the first location. If not, control proceeds to step 620 where the DDR value is incremented past a single module and the module check value is changed. Control proceeds to step 622 to determine if this is the last module. If not, control returns to step 618 to look for the next module. If in step 622 it is determined that this was the last module then control proceeds to step 624 which is a return to the calling sequence.

If it was determined in step 618 that a module was present, control proceeds to step 626 where the first module is set to be address 0 to 128K, it is set to be local memory and is writeable. Control then proceeds to step 628 which is a return from the calling sequence.

Figure 14:
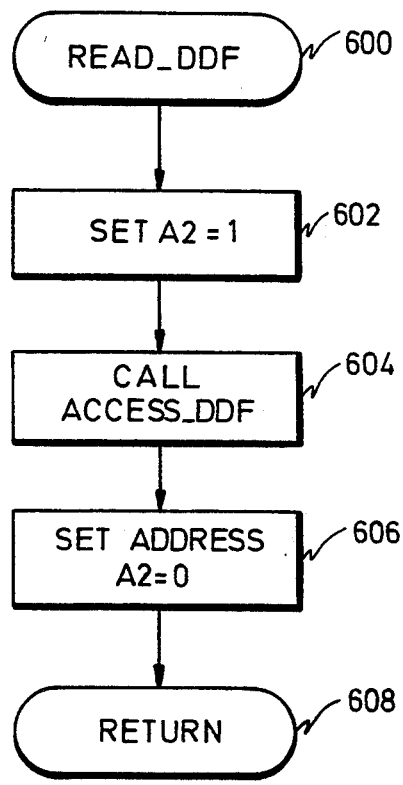

It is also desirable to be able to read the DDF RAM 126 and this can be performed by the READ_DDF sequence 600 (FIG. 14). This sequence is entered with the particular memory address already set in a register so that in step 602 the A2 bit of the starting address is set to 1 to guarantee that a read operation will occur. In step 604 the ACCESS_DDF sequence 500 is called to perform the actual read operation. It is noted that the ACCESS_DDF sequence 500 returns the DDR value. In step 606 the A2 address bit is set to 0 and in step 608 control returns to the calling sequence.

The foregoing disclosure and description of the invention are illustrative and explanatory thereof, and various changes in the size, shape, materials, components, circuitry, wiring connections and contacts, as well as in the details of the illustrated circuitry, construction and method of operation may be made without departing from the spirit of the invention.

We claim:

1. A memory accessing system for use in a computer system having an address bus for communication of address values, a data bus for communication of data and a control bus for communication of status and timing signals, the address bus, data bus and control bus having defined content and timing requirements, the memory accessing system comprising:

at least one memory module, each memory module containing memory having data inputs and outputs for coupling to the data bus and having address lines and control inputs, said address lines and control inputs having defined content and timing requirements different from the content and timing requirements of the address bus, the data bus and the control bus;

a plurality of memory module locations, each memory module location for removably receiving a memory module and having connections for coupling said data inputs and outputs of an attached memory module to the data bus and for connection to said address lines and control inputs of an attached memory module;

means for interfacing address and control signals to each memory module location, said interfacing means having enable signal inputs for selecting one of said plurality of memory module locations; a plurality of address line inputs, a portion of which are coupled to the address bus, wherein said address line inputs are received according to the address bus content and timing requirements; control signal inputs connected to the control bus, wherein said control signal inputs are received according to the control bus content and timing requirements; address line outputs which are connected to each of said memory module location address line input connections and control signal outputs connected to said memory module location control input connections, wherein said control signal outputs are activated based on said enable signal inputs, wherein said address line outputs are developed based on said address line inputs and wherein said address line outputs and control signal outputs are providing according to said memory module content and timing requirements; and memory selection random access memory having a plurality of storage locations; address inputs to select one of said plurality of storage locations of said memory selection random access memory, said address inputs being coupled to the address bus; data inputs for receiving data to be stored in said one storage location in said memory selection random access memory, said data inputs being coupled to the data bus; and data outputs for providing data stored in said one storage location in said memory selection random access memory, said data outputs being coupled to said interfacing means enable signal inputs and the remainder of said interfacing means address line inputs.

2. The memory accessing system of claim 1, further comprising:

means for programming data values into said memory selection random access memory.

3. The memory accessing system of claim 2, wherein said programming means includes means for setting a programming mode and means for storing data values to be provided to said memory selection random access memory.

4. The memory accessing system of claim 3, wherein said programming means further includes means for causing said stored data value to be strobed into said memory selection random access memory during a memory space write operation.

5. The memory accessing system of claim 4, wherein said means for causing said stored data values to be strobed includes means coupled to the address bus for determining the value of an address line on the address bus to enable data value storage if said value is equal to a predetermined value.

6. The memory accessing system of claim 2, further comprising:

means for reading a data value contained in said memory selection random access memory.

7. The memory accessing system of claim 6, wherein said programming means includes means for setting a programming mode and means for storing data values provided by said memory selection random access memory.

8. The memory access system of claim 7, wherein said programming means further includes means for causing said memory selection random access memory to be read during a memory space write operation, and for causing the data value provided by said memory selection random access memory read during said memory space write operation to be strobed into said data value storing means during said memory space write operation.

9. The memory accessing system of claim 8, wherein said means for causing said stored data values to be strobed includes means coupled to the address bus for determining the value of an address line on the address bus to enable data value storage if said value is equal to a predetermined value.

10. The memory accessing system of claim 1, wherein said interfacing means includes a write protect input which is used to disable write operations to said memory module locations and wherein said memory selection random access memory has a data output connected to said interfacing means write protect input.

11. The memory accessing system of claim 1, wherein said interfacing means includes a local memory input which is used to disable operation of said memory modules attached to memory module locations and wherein said memory selection random access memory has a data output connected to said interfacing means local memory input.

* * * * *